United States Patent
Huang

(10) Patent No.: US 10,781,306 B2
(45) Date of Patent: Sep. 22, 2020

(54) MORTAR FORMULATION COMPRISING LONG CHAIN ACRYLIC ESTER MODIFIED VINYL ESTER POLYMERS

(71) Applicant: DAIREN CHEMICAL CORPORATION, Taipei (TW)

(72) Inventor: Yuan-Chang Huang, Taipei (TW)

(73) Assignee: DAIREN CHEMICAL CORPORATION, Taipei (TW)

( * ) Notice: Subject to any disclaimer, the term of this patent is extended or adjusted under 35 U.S.C. 154(b) by 0 days.

(21) Appl. No.: 16/245,862

(22) Filed: Jan. 11, 2019

(65) Prior Publication Data

US 2019/0248998 A1    Aug. 15, 2019

Related U.S. Application Data

(62) Division of application No. 15/895,704, filed on Feb. 13, 2018, now abandoned.

(51) Int. Cl.
| | |
|---|---|
| *C08F 218/08* | (2006.01) |
| *C08F 220/18* | (2006.01) |
| *C08L 33/08* | (2006.01) |
| *C08F 210/02* | (2006.01) |
| *C08L 23/08* | (2006.01) |

(52) U.S. Cl.
CPC ............ *C08L 33/08* (2013.01); *C08F 210/02* (2013.01); *C08F 220/18* (2013.01); *C08L 23/08* (2013.01); *C08F 220/1812* (2020.02); *C08F 220/1818* (2020.02); *C08F 2500/17* (2013.01); *C08F 2500/22* (2013.01); *C08F 2800/20* (2013.01); *C08L 2201/50* (2013.01); *C08L 2201/52* (2013.01); *C08L 2205/025* (2013.01)

(58) Field of Classification Search
CPC ............ C08F 218/08; C08F 2220/1883; C08F 2220/1891; C08F 220/18; C08F 220/1812; C08F 220/1818; C08L 31/04; C08L 33/08; C04B 26/00; C04B 26/04; C04B 26/06; C04B 7/00
See application file for complete search history.

(56) References Cited

U.S. PATENT DOCUMENTS

| | | | | |
|---|---|---|---|---|
| 6,242,512 | B1 * | 6/2001 | Figge | .................. C04B 40/0042 523/340 |
| 6,706,805 | B2 * | 3/2004 | Weitzel | ............... C04B 24/2623 106/724 |
| 2005/0281757 | A1 | 12/2005 | Ibrahim et al. | |
| 2008/0132624 | A1 | 6/2008 | Killat et al. | |
| 2011/0257305 | A1 * | 10/2011 | Kim-Habermehl | .......................... C04B 24/2652 524/8 |
| 2014/0099271 | A1 | 4/2014 | Craig | |
| 2014/0336343 | A1 | 11/2014 | Yang | |

FOREIGN PATENT DOCUMENTS

EP    1634562 A1    3/2006

OTHER PUBLICATIONS

Vinyl acetate/Ethylene Emulsion; May 2016; https://www.celanese.conn/ennulsion-polynners/Ennulsions-Chemistries/Vinyl-aceteethylene-VAE-emulsion-Overview.aspx.
Technical Bulletin, Sasol Olefins & Surfactants, ISOFOL C12-C32, Defined Branched Guerbet Alcohols, 12 pages.
Safety Data Sheet, Sasol ISOFOL 16 Alcohol, 8 pages.
Safety Data Sheet, Sasol ISOFOL 18T Alcohol, 8 pages.
Safety Data Sheet, Sasol ISOFOL 20 Alcohol, 8 pages.
Safety Data Sheet, Sasol ISOFOL 24 Alcohol, 8 pages.
Safety Data Sheet, Sasol ISOFOL 28 Alcohol, 8 pages.
Safety Data Sheet, Sasol ISOFOL 32 Alcohol, 8 pages.
Technical Bulletin, Sasol ISOFOL Alcohols, 2 pages.

* cited by examiner

*Primary Examiner* — Karuna P Reddy
(74) *Attorney, Agent, or Firm* — Nixon Peabody LLP; Thomas P. Pavelko

(57) ABSTRACT

The invention provides a polymer comprising at least one vinyl ester; and at least one acrylic ester of a branched alcohol, wherein the branched alcohol is a branched $C_{16}$-$C_{32}$ alcohol. The invention also provides compositions comprising these polymers.

9 Claims, No Drawings

MORTAR FORMULATION COMPRISING LONG CHAIN ACRYLIC ESTER MODIFIED VINYL ESTER POLYMERS

CROSS-REFERENCE TO RELATED APPLICATIONS

This application is a Division of U.S. Non-provisional application Ser. No. 15/895,704, filed Feb. 13, 2018, and claims benefits of the same under 35 U. S. C. §§ 120 and 121, the entire contents of which are herein incorporated by reference.

TECHNICAL FIELD

The present disclosure relates generally to polymers, including, but not limited to, their aqueous polymer emulsions and polymer powders.

BACKGROUND

All publications herein are incorporated by reference to the same extent as if each individual publication or patent application was specifically and individually indicated to be incorporated by reference. The following description includes information that may be useful in understanding the invention. It is not an admission that any of the information provided herein is prior art or relevant to the presently claimed invention, or that any publication specifically or implicitly referenced is prior art.

Aqueous emulsions and water-redispersible powders based on homo- or copolymers of ethylenically unsaturated monomers are known. They are used in the construction sector as binders, where appropriate in combination with hydraulically setting binders such as cement. Examples are found in construction adhesives, plasters and renderings, mortars, and paints. However, they are also used as binders in coating compositions and adhesives and as textile binders, where addition of polymer emulsions or emulsion powders often serves to improve mechanical strength and adhesion. In some application sectors, especially in plasters, renderings, or construction adhesives, demands include reduction of water absorption or water-repellent action, reduced curing time, and improvement in adhesion.

The invention addresses, in part, some of these demands.

SUMMARY

The following embodiments and aspects thereof are described and illustrated in conjunction with systems, articles of manufacture, compositions and methods which are meant to be exemplary and illustrative, not limiting in scope.

In various embodiments the invention provides a polymer comprising at least one vinyl ester, and at least one acrylic ester of a branched $C_{16}$-$C_{32}$ alcohol. Without limitations, in various embodiments, the polymers of the invention can be in the form of or included in emulsions and polymer powders, e.g., water-redispersible polymer powders. In some embodiments, the polymer is a modified polymer. In some embodiments, the polymer is a modified vinyl ester polymer. In some embodiments, the polymer is a hydrophobically modified vinyl ester polymer. In some embodiments, the polymer is a copolymer. In some embodiments, polymers of the invention can be in the form of or included in dispersions. In some embodiments, polymers of the invention can be in the form of or included in suspensions. In some embodiments, polymers of the invention are in the form of a powder. In some embodiments, the powders are water-redispersible polymer powders. In some embodiments, the polymers of the invention can be in the form of or included in emulsions. In some embodiments, the dispersions are aqueous dispersions. In some embodiments, the suspensions are aqueous suspensions. In some embodiments, the emulsions are aqueous emulsions.

In various embodiments, the polymers of the invention can be used in the typical fields of application. For example, they can be used alone or in combination with conventional polymer emulsions or emulsion powders or polymer dispersions or dispersion powders in building chemical products. Without limitations, in various embodiments the polymers of the invention can be used for the production of building adhesives, tile adhesives, thermal insulation adhesives, renders, skim coat, knifing fillers, flooring screeds, self-leveling compositions, sealing slurries, jointing mortar and paints. In various embodiments, the polymers of the invention can also be used as hydrophobicizing agents for sand, clay, paper, textile, natural or synthetic fibers. Surfaces can also be modified or coated with various embodiments of the polymers of the invention, for example in coating, paint and varnish applications. In some embodiments, fields of application are building adhesives, tile adhesives, thermal insulation adhesives, renders, filling compounds, floor filling compounds, leveling compounds, sealing slurries, jointing mortars and paints.

In various embodiments, the polymers of the invention can be incorporated into building adhesives, tile adhesives, thermal insulation adhesives, renders, filling compounds, floor filling compounds, leveling compounds, sealing slurries, jointing mortars and paints. Optionally, these materials can further comprise hydraulically setting binders such as cements (portland cement, alumina cement, pozzolanic cement, slag cement, magnesia cement, phosphate cement), plaster of Paris and water glass.

In various embodiments, the invention also provides a mortar formulation comprising one or more polymers of the invention. In various embodiments, the invention also provides a mortar formulation comprising at least one polymer of the invention. In some embodiments, the mortar formulation is a cementitious mortar formulation.

In various embodiments the present invention provides a polymer, comprising: at least one vinyl ester; and at least one acrylic ester of a branched alcohol, wherein the branched alcohol is a branched $C_{16}$-$C_{32}$ alcohol. In some embodiments, the branched alcohol is a branched $C_{16}$-$C_{20}$ alcohol. In some embodiments, the acrylic ester of the branched $C_{16}$-$C_{32}$ alcohol is selected from 2-propenoic acid 2-hexyldodecyl ester, 2-propenoic acid 2-octyldodecyl ester, 2-propenoic acid 2-octyldecyl ester, 2-propenoic acid 2-hexyldecyl ester, and any combinations or mixtures thereof. In some embodiments, the polymer further comprises optionally, at least one alkene; and optionally, at least one acrylic ester of a $C_5$-$C_{13}$ alcohol. In some embodiments, the at least one vinyl ester is vinyl acetate. In some embodiments, the branched $C_{16}$-$C_{32}$ alcohol is selected from 2-hexyl-1-decanol, 2-octyl-1-decanol, 2-hexyl-1-dodecanol, 2-octyl-1-dodecanol, and any combinations or mixtures thereof. In some embodiments, the at least one alkene is ethylene, and the at least one acrylic ester of a $C_5$-$C_{13}$ alcohol is lauryl acrylate. In some embodiments, the polymer is a copolymer. In some embodiments, the at least one acrylic ester of a branched $C_{16}$-$C_{32}$ alcohol is an acrylate ester or a methacrylate ester. In some embodiments, the at least one acrylic ester of the branched $C_{16}$-$C_{32}$ alcohol is a mixture comprising: (i) from about 23 to about 27 by weight percent of 2-propenoic acid 2-hexyldodecyl ester; (ii) from about 27 to about 33 by weight percent of 2-propenoic acid 2-octyldodecyl ester; (iii) from about 23 to about 27 by weight percent of 2-propenoic acid 2-octyldecyl ester; and (iv) from about 15 to about 20 by weight percent of 2-propenoic acid 2-hexyldecyl ester. In some embodiments, the polymer is in the form of an emulsion or a powder. In some embodiments, the polymer has a Tg onset temperature of from about 10° C. to about 55° C. In some embodiments, the polymer comprises 60 to 97 percent by weight of the at least one vinyl ester; and 0.5 to 20 percent by weight of the at least one acrylic ester of the branched $C_{16}$-$C_{32}$ alcohol.

In various embodiments, the present invention provides a composition comprising a polymer, wherein the polymer comprises at least one vinyl ester; and at least one acrylic ester of a branched alcohol, wherein the branched alcohol is a branched $C_{16}$-$C_{32}$ alcohol. In some embodiments, the composition is a cementitious composition.

In various embodiments, the present invention provides an article of manufacture comprising a polymer, wherein the polymer comprises at least one vinyl ester; and at least one acrylic ester of a branched alcohol, wherein the branched alcohol is a branched $C_{16}$-$C_{32}$ alcohol.

In various embodiments, the present invention provides a formulation comprising a polymer, wherein the polymer comprises at least one vinyl ester; and at least one acrylic ester of a branched alcohol, wherein the branched alcohol is a branched $C_{16}$-$C_{32}$ alcohol. In some embodiments, the formulation is a mortar formulation. In some embodiments, the mortar formulation is a tile adhesive formulation or a render formulation. In some embodiments, the mortar formulation is a render formulation. In some embodiments, the render formulation has a 14 day dry curing adhesion strength of greater than 1.8 $N/mm^2$ to about 2.0 $N/mm^2$. In some embodiments, the render formulation has a 14 day water absorption in the range of about 1.8 $g/cm^2$ to less than 2.7 $g/cm^2$. In some embodiments, the render formulation has a 14 day dry curing adhesion strength in the range of 1.65 $N/mm^2$ to 2.06 $N/mm^2$ and a 14 day water absorption in the range of 1.85 $g/cm^2$ to 3.76 $g/cm^2$.

DETAILED DESCRIPTION

All references cited herein are incorporated by reference in their entirety as though fully set forth. Unless defined otherwise, technical and scientific terms used herein have the same meaning as commonly understood by one of ordinary skill in the art to which this invention belongs. Unless stated otherwise, or implicit from context, the following terms and phrases include the meanings provided below. Unless explicitly stated otherwise, or apparent from context, the terms and phrases below do not exclude the meaning that the term or phrase has acquired in the art to which it pertains. Unless otherwise defined, all technical and scientific terms used herein have the same meaning as commonly understood by one of ordinary skill in the art to which this invention belongs. It should be understood that this invention is not limited to the particular methodology, protocols, and reagents, etc., described herein and as such can vary. The definitions and terminology used herein are provided to aid in describing particular embodiments, and are not intended to limit the claimed invention, because the scope of the invention is limited only by the claims.

One skilled in the art will recognize many methods and materials similar or equivalent to those described herein, which could be used in the practice of the invention. Other features and advantages of the invention will become apparent from the following detailed description. Indeed, the invention is in no way limited to the methods and materials described. For convenience, certain terms employed herein, in the specification, examples and appended claims are collected here.

As used herein the term "comprising" or "comprises" is used in reference to compositions, methods, articles of manufacture, systems, and respective component(s) thereof, that are useful to an embodiment, yet open to the inclusion of unspecified elements, whether useful or not. It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). Although the open-ended term "comprising," as a synonym of terms such as including, containing, or having, is used herein to describe and claim the invention, the invention, or embodiments thereof, may alternatively be described using alternative terms such as "consisting of" or "consisting essentially of."

Unless stated otherwise, the terms "a" and "an" and "the" and similar references used in the context of describing a particular embodiment of the application (especially in the context of claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. The abbreviation, "e.g." is derived from the Latin exempli gratia, and is used herein to indicate a non-limiting example. Thus, the abbreviation "e.g." is synonymous with the term "for example." No language in the specification should be construed as indicating any non-claimed element essential to the practice of the application.

"Optional" or "optionally" means that the subsequently described circumstance may or may not occur, so that the description includes instances where the circumstance occurs and instances where it does not.

As used herein, the term "substituted" refers to independent replacement of one or more (typically 1, 2, 3, 4, or 5) of the hydrogen atoms on the substituted moiety with substituents independently selected from the group of substituents listed below in the definition for "substituents" or otherwise specified. In general, a non-hydrogen substituent can be any substituent that can be bound to an atom of the given moiety that is specified to be substituted. Examples of substituents include, but are not limited to, acyl, acylamino, acyloxy, aldehyde, alicyclic, aliphatic, alkanesulfonamido, alkanesulfonyl, alkaryl, alkenyl, alkoxy, alkoxycarbonyl, alkyl, alkylamino, alkylcarbanoyl, alkylene, alkylidene, alkylthios, alkynyl, amide, amido, amino, amidine, aminoalkyl, aralkyl, aralkylsulfonamido, arenesulfonamido, arenesulfonyl, aromatic, aryl, arylamino, arylcarbanoyl, aryloxy, azido, carbamoyl, carbonyl, carbonyls including ketones, carboxy, carboxylates, $CF_3$, cyano (CN), cycloalkyl, cycloalkylene, ester, ether, haloalkyl, halogen, halogen, heteroaryl, heterocyclyl, hydroxy, hydroxyalkyl, imino, iminoketone, ketone, mercapto, nitro, oxaalkyl, oxo, oxoalkyl, phosphoryl (including phosphonate and phosphinate), silyl groups, sulfonamido, sulfonyl (including sulfate, sulfamoyl and sulfonate), thiols, and ureido moieties, each of which may optionally also be substituted or unsubstituted. In some cases, two substituents, together with the carbon(s) to which they are attached to, can form a ring. In some cases, two or more substituents, together with the carbon(s) to which they are attached to, can form one or more rings. In some cases, two or more substituents, together with the carbon(s) to which they are attached to, can form at least one ring.

Substituents may be protected as necessary and any of the protecting groups commonly used in the art may be employed. Non-limiting examples of protecting groups may be found, for example, in Greene and Wuts, Protective Groups in Organic Synthesis, 44$^{th}$. Ed., Wiley & Sons, 2006.

It is noted in regard to all of the definitions provided herein that the definitions should be interpreted as being open ended in the sense that further substituents beyond those specified may be included. Hence, a $C_1$ alkyl indicates that there is one carbon atom but does not indicate what are the substituents on the carbon atom. Hence, a $C_1$ alkyl comprises methyl (i.e., —$CH_3$) as well as —$CR_aR_bR_c$ where $R_a$, $R_b$, and $R_c$ can each independently be hydrogen or any other substituent where the atom alpha to the carbon is a heteroatom or cyano. Hence, $CF_3$, $CH_2OH$ and $CH_2CN$ are all $C_1$ alkyls.

Unless otherwise stated, structures depicted herein are meant to include compounds which differ only in the presence of one or more isotopically enriched atoms. For example, compounds having the present structure except for the replacement of a hydrogen atom by a deuterium or tritium, or the replacement of a carbon atom by a $^{13}$C- or $^{14}$C-enriched carbon are within the scope of the invention.

Synthetic Preparation. In various embodiments, compounds, compositions, formulations, articles of manufacture, reagents, products, etc. (e.g., monomers, monomer compositions, polymers, mortar formulations, etc.) of the invention as disclosed herein may be synthesized using any synthetic method available to one of skill in the art. In various embodiments, the compounds, compositions, formulations, articles of manufacture, reagents, products, etc. (e.g., monomers, monomer compositions, polymers, mortar formulations, etc.) of the invention disclosed herein can be prepared in a variety of ways known to one skilled in the art of organic synthesis, and in analogy with the exemplary compounds, compositions, formulations, articles of manufacture, reagents, products, etc. whose synthesis is described herein. The starting materials used in preparing these compounds, compositions, formulations, articles of manufacture, reagents, products, etc. may be commercially available or prepared by known methods. Preparation of compounds, can involve the protection and deprotection of various chemical groups. The need for protection and deprotection, and the selection of appropriate protecting groups can be readily determined by one skilled in the art. The chemistry of protecting groups can be found, for example, in Greene and Wuts, Protective Groups in Organic Synthesis, 44th. Ed., Wiley & Sons, 2006, which is incorporated herein by reference in its entirety. Non-limiting examples of synthetic methods used to prepare various embodiments of compounds, compositions, formulations, articles of manufacture, reagents, products, etc. (e.g., monomers, monomer compositions, polymers, mortar formulations, etc.) of the invention are disclosed in the Examples section herein. The reactions of the processes described herein can be carried out in suitable solvents which can be readily selected by one of skill in the art of organic synthesis. Suitable solvents can be substantially nonreactive with the starting materials (reactants), the intermediates, or products at the temperatures at which the reactions are carried out, i.e., temperatures which can range from the solvent's freezing temperature to the solvent's boiling temperature. A given reaction can be carried out in one solvent or a mixture of more than one solvent. Depending on the particular reaction step, suitable solvents for a particular reaction step can be selected.

Non-Limiting Embodiments of the Invention

In forming the polymers disclosed herein, those skilled in the art know that they may be formed of monomers, oligomers, or even other pre-cursors of the polymer, sometimes termed monomer residue, as components of the precursors are lost during the reaction, such as the loss of water molecules in a condensation reaction. Thus, it should be understood throughout this specification and claims that the skilled worker in the art to whom this disclosure is directed will understand that when we speak of a polymer comprising different sub-units, such as vinyl ester or acrylic ester of a branched alcohol, the sub-units to which we are referring are the monomer, oligomer or polymer pre-cursors of such units. For example, in various embodiments of the present invention, the polymer comprises at least one vinyl ester monomeric unit; and at least one acrylic ester monomeric unit of a branched alcohol, wherein the branched alcohol is a branched $C_{16}$-$C_{32}$ alcohol. In addition, in some embodiments of the present invention, the polymer may further comprise at least one alkene monomeric unit; and at least one acrylic ester monomeric unit of a $C_5$-13 alcohol.

Various embodiments of the invention are based on the inventors' discovery that polymers of the invention comprising at least one vinyl ester, and at least one acrylic ester of a branched alcohol (e.g., branched $C_{16}$-$C_{32}$ alcohol or branched $C_{16}$-$C_{20}$ alcohol) show improved polymer film water resistance. In addition, in various embodiments the mortar formulations comprising various embodiments of polymers of the invention display enhanced hydrophobic performance and adhesive strength. The polymers of the invention can be used in many kinds of concrete or mortar formulations to effectively reduce the absorption of water.

In various embodiments, the invention provides a polymer, where the polymer comprises units derived from at least one vinyl ester; and units derived from at least one acrylic ester of a branched alcohol, wherein the branched alcohol is a branched $C_{16}$-$C_{32}$ alcohol. In some embodiments, the branched alcohol is a branched $C_{16}$-$C_{20}$ alcohol. In some embodiments, the polymer is a copolymer. In some embodiment, the polymer is a hydrophobic polymer. In some embodiments, the copolymer is a hydrophobic copolymer. In some embodiments, the polymer is an acrylic modified vinyl ester polymer. In some embodiments, the polymer is an acrylic modified vinyl ester copolymer. In some embodiments, the acrylic ester of the branched $C_{16}$-$C_{32}$ alcohol is an acrylate ester. In some embodiments, the acrylic ester of the branched $C_{16}$-$C_{32}$ alcohol is a methacrylate ester. In some embodiments, the acrylic ester of the branched $C_{16}$-$C_{20}$ alcohol is an acrylate ester. In some embodiments, the acrylic ester of the branched $C_{16}$-$C_{20}$ alcohol is a methacrylate ester. In some embodiments, the polymer optionally further comprises units derived from at least one alkene. In some embodiments, the polymer optionally further comprises units derived from at least one acrylic ester of a $C_5$-$C_{13}$ alcohol. In some embodiments, the polymer further comprises optionally, units derived from at least one alkene; and optionally, units derived from at least one acrylic ester of a $C_5$-$C_{13}$ alcohol.

In various embodiments, the invention provides a polymer, where the polymer comprises units derived from at least one vinyl ester; and units derived from at least one acrylic ester of a branched alcohol, wherein the branched alcohol is a branched $C_{16}$-$C_{20}$ alcohol.

In some embodiments, the invention provides a polymer, comprising: units derived from at least one vinyl ester; units derived from at least one acrylic ester of a branched alcohol, wherein the branched alcohol is a branched $C_{16}$-$C_{32}$ alcohol; optionally, units derived from at least one alkene; and optionally, units derived from at least one acrylic ester of a $C_5$-$C_{13}$ alcohol.

In some embodiments, the invention provides a polymer, comprising: units derived from at least one vinyl ester; units derived from at least one acrylic ester of a branched alcohol, wherein the branched alcohol is a branched $C_{16}$-$C_{20}$ alcohol; optionally, units derived from at least one alkene; and optionally, units derived from at least one acrylic ester of a $C_5$-$C_{13}$ alcohol.

In some embodiments, the invention provides a polymer, comprising: units derived from at least one vinyl ester; and units derived from at least one acrylic ester of a branched alcohol, wherein the at least one acrylic ester of a branched alcohol has the structure of Formula (III) or Formula (IV). Formula (III):

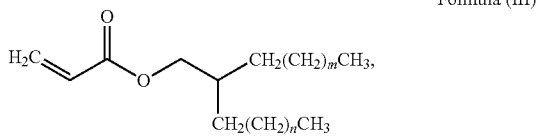

where,
m is 6 to 22; and
n is 4 to 13, wherein $10 \leq m+n \leq 26$.
Formula (IV):

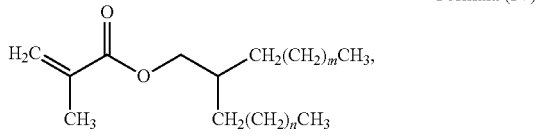

where,
m is 6 to 22; and
n is 4 to 13, wherein $10 \leq m+n \leq 26$.

In some embodiments, the vinyl ester has the structure of Formula (I). Formula (I):

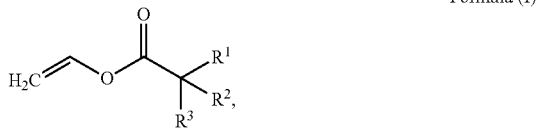

where,
$R^1$ is H or an optionally substituted substituent;
$R^2$ is H or an optionally substituted substituent; and
$R^3$ is H or an optionally substituted substituent, wherein optionally any two or more of $R^1$, $R^2$, or $R^3$ may be joined together to form one or more rings.

In some embodiments, the invention provides a polymer, comprising: units derived from at least one vinyl ester; units derived from at least one acrylic ester of a branched alcohol, wherein the at least one acrylic ester of a branched alcohol has the structure of Formula (III) or Formula (IV); optionally, units derived from at least one alkene; and optionally, units derived from at least one acrylic ester of a $C_5$-$C_{13}$ alcohol. In some embodiments, the vinyl ester has the structure of Formula (I).

In some embodiments, the invention provides a polymer, comprising: units derived from at least one vinyl ester; and units derived from at least one acrylic ester of a branched $C_{16}$-$C_{32}$ alcohol, wherein the at least one acrylic ester of a branched $C_{16}$-$C_{32}$ alcohol has the structure of Formula (III) or Formula (IV). In some embodiments, the vinyl ester has the structure of Formula (I).

In some embodiments, the invention provides a polymer, comprising: units derived from at least one vinyl ester; units derived from at least one acrylic ester of a branched $C_{16}$-$C_{32}$ alcohol, wherein the at least one acrylic ester of a branched $C_{16}$-$C_{32}$ alcohol has the structure of Formula (III) or Formula (IV); optionally, units derived from at least one alkene; and optionally, units derived from at least one acrylic ester of a $C_5$-$C_{13}$ alcohol. In some embodiments, the vinyl ester has the structure of Formula (I).

In some embodiments, the invention provides a polymer, comprising: units derived from at least one vinyl ester; and units derived from at least one acrylic ester of a branched $C_{16}$-$C_{20}$ alcohol, wherein the at least one acrylic ester of a branched $C_{16}$-$C_{20}$ alcohol has the structure of Formula (III) or Formula (IV). In some embodiments, the vinyl ester has the structure of Formula (I).

In some embodiments, the invention provides a polymer, comprising: units derived from at least one vinyl ester; units derived from at least one acrylic ester of a branched $C_{16}$-$C_{20}$ alcohol, wherein the at least one acrylic ester of a branched $C_{16}$-$C_{20}$ alcohol has the structure of Formula (III) or Formula (IV); optionally, units derived from at least one alkene; and optionally, units derived from at least one acrylic ester of a $C_5$-$C_{13}$ alcohol. In some embodiments, the vinyl ester has the structure of Formula (I).

In various embodiments, the invention provides a polymer, wherein the polymer comprises at least one vinyl ester; and at least one acrylic ester of a branched alcohol, wherein the branched alcohol is a branched $C_{16}$-$C_{32}$ alcohol. In some embodiments, the branched alcohol is a branched $C_{16}$-$C_{20}$ alcohol. In some embodiments, the polymer is a copolymer. In some embodiment, the polymer is a hydrophobic polymer. In some embodiments, the copolymer is a hydrophobic copolymer. In some embodiments, the polymer is an acrylic modified vinyl ester polymer. In some embodiments, the polymer is an acrylic modified vinyl ester copolymer. In some embodiments, the acrylic ester of the branched $C_{16}$-$C_{32}$ alcohol is an acrylate ester. In some embodiments, the acrylic ester of the branched $C_{16}$-$C_{32}$ alcohol is a methacrylate ester. In some embodiments, the acrylic ester of the branched $C_{16}$-$C_{20}$ alcohol is an acrylate ester. In some embodiments, the acrylic ester of the branched $C_{16}$-$C_{20}$ alcohol is a methacrylate ester. In some embodiments, the polymer optionally further comprises at least one alkene. In some embodiments, the polymer optionally further comprises at least one acrylic ester of a $C_5$-$C_{13}$ alcohol. In some embodiments, the polymer further comprises optionally at least one alkene; and optionally at least one acrylic ester of a $C_5$-$C_{13}$ alcohol.

In some embodiments, the invention provides a polymer, comprising: at least one vinyl ester; and at least one acrylic ester of a branched alcohol, wherein the at least one acrylic ester of a branched alcohol has the structure of Formula (III) or Formula (IV). In some embodiments, the vinyl ester has the structure of Formula (I).

In some embodiments, the invention provides a polymer, comprising: at least one vinyl ester; at least one acrylic ester of a branched alcohol, wherein the at least one acrylic ester of a branched alcohol has the structure of Formula (III) or Formula (IV); optionally, at least one alkene; and optionally, at least one acrylic ester of a $C_5$-$C_{13}$ alcohol. In some embodiments, the vinyl ester has the structure of Formula (I).

In some embodiments, the invention provides a polymer, comprising: at least one vinyl ester; and at least one acrylic ester of a branched $C_{16}$-$C_{32}$ alcohol, wherein the at least one acrylic ester of a branched $C_{16}$-$C_{32}$ alcohol has the structure of Formula (III) or Formula (IV). In some embodiments, the vinyl ester has the structure of Formula (I).

In some embodiments, the invention provides a polymer, comprising: at least one vinyl ester; at least one acrylic ester of a branched $C_{16}$-$C_{32}$ alcohol, wherein the at least one acrylic ester of a branched $C_{16}$-$C_{32}$ alcohol has the structure of Formula (III) or Formula (IV); optionally, at least one alkene; and optionally, at least one acrylic ester of a $C_5$-$C_{13}$ alcohol. In some embodiments, the vinyl ester has the structure of Formula (I).

In some embodiments, the invention provides a polymer, comprising: at least one vinyl ester; and at least one acrylic ester of a branched $C_{16}$-$C_{20}$ alcohol, wherein the at least one acrylic ester of a branched $C_{16}$-$C_{20}$ alcohol has the structure of Formula (III) or Formula (IV). In some embodiments, the vinyl ester has the structure of Formula (I).

In some embodiments, the invention provides a polymer, comprising: at least one vinyl ester; at least one acrylic ester of a branched $C_{16}$-$C_{20}$ alcohol, wherein the at least one acrylic ester of a branched $C_{16}$-$C_{20}$ alcohol has the structure of Formula (III) or Formula (IV); optionally, at least one alkene; and optionally, at least one acrylic ester of a $C_5$-$C_{13}$ alcohol. In some embodiments, the vinyl ester has the structure of Formula (I).

In some embodiments, the invention provides a polymer comprising: from about 60 to about 97 percent by weight of at least one vinyl ester; and from about 0.5 to about 20 percent by weight of at least one acrylic ester of a branched alcohol, wherein the branched alcohol is a branched $C_{16}$-$C_{32}$ alcohol. In some embodiments, the branched alcohol is a branched $C_{16}$-$C_{20}$ alcohol. In some embodiments, the polymer is a copolymer. In some embodiment, the polymer is a hydrophobic polymer. In some embodiments, the copolymer is a hydrophobic copolymer. In some embodiments, the polymer is an acrylic modified vinyl ester polymer. In some embodiments, the polymer is an acrylic modified vinyl ester copolymer. In some embodiments, the acrylic ester of the branched $C_{16}$-$C_{32}$ alcohol is an acrylate ester. In some embodiments, the acrylic ester of the branched $C_{16}$-$C_{32}$ alcohol is a methacrylate ester. In some embodiments, the acrylic ester of the branched $C_{16}$-$C_{20}$ alcohol is an acrylate ester. In some embodiments, the acrylic ester of the branched $C_{16}$-$C_{20}$ alcohol is a methacrylate ester. In some embodiments, the polymer further comprises optionally, from about 0 to about 40 percent by weight of at least one alkene; and optionally, from about 0 to about 40 percent by weight of an acrylic ester of a $C_5$-$C_{13}$ alcohol. In some embodiments, the percent by weight of the at least one vinyl ester is based on the total weight of the polymer. In some embodiments, the percent by weight of the at least one acrylic ester of a branched alcohol, wherein the branched alcohol is a branched $C_{16}$-$C_{32}$ alcohol, is based on the total weight of the polymer. In some embodiments, the percent by weight of the at least one acrylic ester of a branched alcohol, wherein the branched alcohol is a branched $C_{16}$-$C_{20}$ alcohol, is based on the total weight of the polymer. In some embodiments, the percent by weight of the at least one alkene is based on the total weight of the polymer. In some embodiments, the percent by weight of the acrylic ester of a $C_5$-$C_{13}$ alcohol is based on the total weight of the polymer.

In various embodiments, the invention provides a polymer, comprising: from about 60 to about 97 percent by weight of at least one vinyl ester; from about 0.5 to about 20 percent by weight of at least one acrylic ester of a branched alcohol, wherein the branched alcohol is a branched $C_{16}$-$C_{32}$ alcohol; optionally, from about 0 to about 40 percent by weight of at least one alkene; and optionally, from about 0 to about 40 percent by weight of an acrylic ester of a $C_5$-$C_{13}$ alcohol. In some embodiments, the branched alcohol is a branched $C_{16}$-$C_{20}$ alcohol. In some embodiments, the percent by weight of the at least one vinyl ester is based on the total weight of the polymer. In some embodiments, the percent by weight of the at least one acrylic ester of a branched alcohol, wherein the branched alcohol is a branched $C_{16}$-$C_{32}$ alcohol, is based on the total weight of the polymer. In some embodiments, the percent by weight of the at least one acrylic ester of a branched alcohol, wherein the branched alcohol is a branched $C_{16}$-$C_{20}$ alcohol, is based on the total weight of the polymer. In some embodiments, the percent by weight of the at least one alkene is based on the total weight of the polymer. In some embodiments, the percent by weight of the acrylic ester of a $C_5$-$C_{13}$ alcohol is based on the total weight of the polymer. In some embodiments, the polymer is a copolymer. In some embodiment, the polymer is a hydrophobic polymer. In some embodiments, the copolymer is a hydrophobic copolymer. In some embodiments, the polymer is an acrylic modified vinyl ester polymer. In some embodiments, the polymer is an acrylic modified vinyl ester copolymer.

In some embodiments, the invention provides a polymer comprising: from about 60 to about 97 percent by weight of at least one vinyl ester; and from about 0.5 to about 20 percent by weight of at least one acrylic ester of a branched alcohol, wherein the branched alcohol is a branched $C_{16}$-$C_{20}$ alcohol.

In various embodiments, the invention provides a polymer, comprising: from about 60 to about 97 percent by weight of at least one vinyl ester; from about 0.5 to about 20 percent by weight of at least one acrylic ester of a branched alcohol, wherein the branched alcohol is a branched $C_{16}$-$C_{20}$ alcohol; optionally, from about 0 to about 40 percent by weight of at least one alkene; and optionally, from about 0 to about 40 percent by weight of an acrylic ester of a $C_5$-$C_{13}$ alcohol.

In various embodiments, a polymer of the invention comprises at least one vinyl ester; and at least one acrylic ester of a branched alcohol, wherein the branched alcohol is a branched $C_{16}$-$C_{32}$ alcohol.

In various embodiments, a polymer of the invention comprises at least one vinyl ester; and at least one acrylic ester of a branched alcohol, wherein the branched alcohol is a branched $C_{16}$-$C_{20}$ alcohol.

In some embodiments, the polymer of the invention comprises from about 60 to about 98 percent by weight of at least one vinyl ester, and from about 0.5 to about 20 percent by weight of at least one acrylic ester of a branched $C_{16}$-$C_{32}$ alcohol.

In some embodiments, the polymer of the invention comprises from about 60 to about 98 percent by weight of at least one vinyl ester, and from about 0.5 to about 20 percent by weight of at least one acrylic ester of a branched $C_{16}$-$C_{20}$ alcohol.

Vinyl Ester Monomers

Generally, in various embodiments of the invention, the amount of the at least one vinyl ester in the polymer can be any desired amount. In some embodiments, the amount of at least one vinyl ester in the polymer ranges from about 60 to about 97 percent by weight of the total weight of the polymer. In some embodiments, the amount of at least one vinyl ester in the polymer ranges from about 75 to about 95 percent by weight of the total weight of the polymer.

In some embodiments, the polymer comprises 60 to 97, 60 to 95, 60 to 90, 60 to 85, 60 to 80, 60 to 75, 60 to 70, or 60 to 65 percent by weight of at least one vinyl ester. In some embodiments, the polymer comprises 65 to 97, 65 to 95, 65 to 90, 65 to 85, 65 to 80, 65 to 75, or 65 to 70 percent by weight of at least one vinyl ester. In some embodiments, the polymer comprises 70 to 97, 70 to 95, 70 to 90, 70 to 85, 70 to 80, or 70 to 75 percent by weight of at least one vinyl ester. In some embodiments, the polymer comprises 75 to 97, 75 to 95, 75 to 90, 75 to 85, or 75 to 80 percent by weight of at least one vinyl ester. In some embodiments, the polymer comprises 80 to 97, 80 to 95, 80 to 90, or 80 to 85 percent by weight of at least one vinyl ester. In some embodiments, the polymer comprises 85 to 97, 85 to 95, or 85 to 90 percent by weight of at least one vinyl ester. In some embodiments, the polymer comprises 90 to 97 or 90 to 95 percent by weight of at least one vinyl ester. In some embodiments, the percent by weight of at least one vinyl ester is based on the total weight of the polymer.

In some embodiments, the at least one vinyl ester is at least two vinyl esters, wherein at least two of the vinyl esters are different.

In various embodiments, the vinyl ester has the structure of Formula (I):

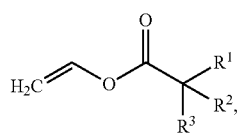

Formula (I)

where,
$R^1$ is H or an optionally substituted substituent;
$R^2$ is H or an optionally substituted substituent; and
$R^3$ is H or an optionally substituted substituent, wherein optionally any two or more of $R^1$, $R^2$, or
$R^3$ may be joined together to form one or more rings.

Exemplary vinyl esters for use in various embodiments of the invention (e.g., polymers of the invention and/or monomer compositions) include, but are not limited to, vinyl esters of carboxylic acids having from 1 to 18 carbon atoms and vinyl esters of alpha-branched monocarboxylic acids having from 9 to 13 carbon atoms. Non-limiting examples of vinyl esters include, vinyl acetate, vinyl propionate, vinyl butyrate, vinyl 2-ethylhexanoate, vinyl laurate, 1-methylvinyl acetate, vinyl pivalate, VeoVa9® or VeoVa10®, vinyl benzoate, and vinyl isopropyl acetate. In some embodiments, the vinyl ester is selected from vinyl acetate, vinyl propionate, vinyl butyrate, vinyl 2-ethylhexanoate, vinyl laurate, 1-methylvinyl acetate, vinyl pivalate, vinyl benzoate, and vinyl isopropyl acetate. In some embodiments of the invention, the vinyl ester is vinyl acetate. In some embodiments, the vinyl ester is a vinyl ester monomer.

Generally, the vinyl ester may be in any physical form. For example, in some embodiments, the vinyl ester may be a gas, a liquid, a solid, a semi-solid, etc.

Acrylic Ester Monomers (Acrylic Ester of a Branched $C_{16}$-$C_{32}$ Alcohol and Acrylic Ester of a Branched $C_{16}$-$C_{20}$ Alcohol)

Generally, in various embodiments of the invention, the amount of the at least one acrylic ester of the branched $C_{16}$ to $C_{32}$ alcohol in the polymer can be any desired amount. In some embodiments, the amount of at least one acrylic ester of a branched $C_{16}$ to $C_{32}$ alcohol ranges from about 0.5 to about 20 percent by weight of the total weight of the polymer. In some embodiments, the polymer comprises 0.5 to 20, 0.5 to 15, 0.5 to 10, 0.5 to 5, 0.5 to 3, 0.5 to 2, or 0.5 to 1 percent by weight of at least one acrylic ester of a branched alcohol, wherein the branched alcohol is a branched $C_{16}$-$C_{32}$ alcohol.

In some embodiments, the polymer comprises 1 to 20, 1 to 15, 1 to 10, 1 to 5, 1 to 3, or 1 to 2 percent by weight of at least one acrylic ester of a branched alcohol, wherein the branched alcohol is a branched $C_{16}$-$C_{32}$ alcohol.

In some embodiments, the polymer comprises 2 to 20, 2 to 15, 2 to 10, 2 to 5, or 2 to 3 percent by weight of at least one acrylic ester of a branched alcohol, wherein the branched alcohol is a branched $C_{16}$-$C_{32}$ alcohol.

In some embodiments, the polymer comprises 3 to 20, 3 to 15, 3 to 10, or 3 to 5 percent by weight of at least one acrylic ester of a branched alcohol, wherein the branched alcohol is a branched $C_{16}$-$C_{32}$ alcohol.

In some embodiments, the polymer comprises 5 to 20, 5 to 15 or 5 to 10 percent by weight of at least one acrylic ester of a branched alcohol, wherein the branched alcohol is a branched $C_{16}$-$C_{32}$ alcohol.

In some embodiments, the polymer comprises 10 to 20 or 10 to 15 percent by weight of at least one acrylic ester of a branched alcohol, wherein the branched alcohol is a branched $C_{16}$-$C_{32}$ alcohol.

In some embodiments, the polymer comprises 15 to 20 percent by weight of at least one acrylic ester of a branched alcohol, wherein the branched alcohol is a branched $C_{16}$-$C_{32}$ alcohol.

In some embodiments, the percent by weight of at least one acrylic ester of a branched alcohol, wherein the branched alcohol is a branched $C_{16}$-$C_{32}$ alcohol, is based on the total weight of the polymer.

In some embodiments, the branched alcohol is a branched $C_{16}$-$C_{20}$ alcohol.

Generally, in various embodiments of the invention, the amount of the at least one acrylic ester of the branched $C_{16}$ to $C_{20}$ alcohol in the polymer can be any desired amount. In some embodiments, the amount of at least one acrylic ester of a branched $C_{16}$ to $C_{20}$ alcohol ranges from about 0.5 to about 20 percent by weight of the total weight of the polymer. In some embodiments, the polymer comprises 0.5 to 20, 0.5 to 15, 0.5 to 10, 0.5 to 5, 0.5 to 3, 0.5 to 2, or 0.5 to 1 percent by weight of at least one acrylic ester of a branched alcohol, wherein the branched alcohol is a branched $C_{16}$-$C_{20}$ alcohol.

In some embodiments, the polymer comprises 1 to 20, 1 to 15, 1 to 10, 1 to 5, 1 to 3, or 1 to 2 percent by weight of at least one acrylic ester of a branched alcohol, wherein the branched alcohol is a branched $C_{16}$-$C_{20}$ alcohol.

In some embodiments, the polymer comprises 2 to 20, 2 to 15, 2 to 10, 2 to 5, or 2 to 3 percent by weight of at least one acrylic ester of a branched alcohol, wherein the branched alcohol is a branched $C_{16}$-$C_{20}$ alcohol.

In some embodiments, the polymer comprises 3 to 20, 3 to 15, 3 to 10, or 3 to 5 percent by weight of at least one acrylic ester of a branched alcohol, wherein the branched alcohol is a branched $C_{16}$-$C_{20}$ alcohol.

In some embodiments, the polymer comprises 5 to 20, 5 to 15 or 5 to 10 percent by weight of at least one acrylic ester of a branched alcohol, wherein the branched alcohol is a branched $C_{16}$-$C_{20}$ alcohol.

In some embodiments, the polymer comprises 10 to 20 or 10 to 15 percent by weight of at least one acrylic ester of a branched alcohol, wherein the branched alcohol is a branched $C_{16}$-$C_{20}$ alcohol.

In some embodiments, the polymer comprises 15 to 20 percent by weight of at least one acrylic ester of a branched alcohol, wherein the branched alcohol is a branched $C_{16}$-$C_{20}$ alcohol.

In some embodiments, the percent by weight of at least one acrylic ester of a branched alcohol, wherein the branched alcohol is a branched $C_{16}$-$C_{20}$ alcohol, is based on the total weight of the polymer.

In some embodiments, the at least one acrylic ester of a branched alcohol is at least one acrylate ester of a branched alcohol. In some embodiments, the at least one acrylic ester of a branched alcohol is at least one methacrylate ester of a branched alcohol. In some embodiments, the at least one acrylic ester of a branched alcohol is at least one acrylate ester of a branched alcohol, at least one methacrylate ester of a branched alcohol, or a combination or mixture thereof.

In some embodiments, the acrylic ester of a branched $C_{16}$-$C_{32}$ alcohol is an acrylate ester of a branched $C_{16}$-$C_{32}$ alcohol or a methacrylate ester of a branched $C_{16}$-$C_{32}$ alcohol. In some embodiments, the acrylic ester of a branched $C_{16}$-$C_{32}$ alcohol is an acrylate ester of a branched $C_{16}$-$C_{32}$ alcohol. In some embodiments, the acrylic ester of a branched $C_{16}$-$C_{32}$ alcohol is a methacrylate ester of a branched $C_{16}$-$C_{32}$ alcohol. In some embodiments, the acrylic ester of a branched $C_{16}$-$C_{20}$ alcohol is an acrylate ester of a branched $C_{16}$-$C_{20}$ alcohol or a methacrylate ester of a branched $C_{16}$-$C_{20}$ alcohol. In some embodiments, the acrylic ester of a branched $C_{16}$-$C_{20}$ alcohol is an acrylate ester of a branched $C_{16}$-$C_{20}$ alcohol. In some embodiments, the acrylic ester of a branched $C_{16}$-$C_{20}$ alcohol is a methacrylate ester of a branched $C_{16}$-$C_{20}$ alcohol.

In various embodiments, the acrylic ester of a branched alcohol can be derived from a branched $C_{16}$-$C_{32}$ alcohol. In various embodiments, the acrylic ester of a branched alcohol can be derived from a branched $C_{16}$-$C_{20}$ alcohol. In various embodiments, the acrylic ester of a branched $C_{16}$-$C_{32}$ alcohol can be derived from a branched $C_{16}$-$C_{32}$ alcohol. In various embodiments, the acrylic ester of a branched $C_{16}$-$C_{20}$ alcohol can be derived from a branched $C_{16}$-$C_{20}$ alcohol. In various embodiments, the acrylic ester of a branched alcohol can be derived from a branched $C_{16}$-$C_{32}$ alcohol, or any combination or mixture of branched $C_{16}$-$C_{32}$ alcohols. In various embodiments, the acrylic ester of a branched alcohol can be derived from a branched $C_{16}$-$C_{20}$ alcohol, or any combination or mixture of branched $C_{16}$-$C_{20}$ alcohols. In various embodiments, the acrylic ester of a branched $C_{16}$-$C_{32}$ alcohol can be derived from a branched $C_{16}$-$C_{32}$ alcohol, or any combination or mixture of branched $C_{16}$-$C_{32}$ alcohols. In various embodiments, the acrylic ester of a branched $C_{16}$-$C_{20}$ alcohol can be derived from a branched $C_{16}$-$C_{20}$ alcohol, or any combination or mixture of branched $C_{16}$-$C_{20}$ alcohols.

In various embodiments, the acrylic ester of a branched alcohol can be derived from a branched alcohol containing 16 to 32 carbon atoms (i.e., a branched $C_{16}$-$C_{32}$ alcohol). In various embodiments, the acrylic ester of a branched alcohol can be derived from a branched alcohol containing 16 to 20 carbon atoms (i.e., a branched $C_{16}$-$C_{20}$ alcohol). In various embodiments, the acrylic ester of a branched $C_{16}$-$C_{32}$ alcohol can be derived from a branched alcohol containing 16 to 32 carbon atoms (i.e., a branched $C_{16}$-$C_{32}$ alcohol). In various embodiments, the acrylic ester of a branched $C_{16}$-$C_{20}$ alcohol can be derived from a branched alcohol containing 16 to 20 carbon atoms (i.e., a branched $C_{16}$-$C_{20}$ alcohol).

In some embodiments, the branched alcohol contains 16 to 32 carbon atoms, 16 to 31 carbon atoms, 16 to 30 carbon atoms, 16 to 29 carbon atoms, 16 to 28 carbon atoms, 16 to 27 carbon atoms, 16 to 26 carbon atoms, 16 to 25 carbon atoms, 16 to 24 carbon atoms, 16 to 23 carbon atoms, 16 to 22 carbon atoms, 16 to 21 carbon atoms, or 16 to 20 carbon atoms.

In some embodiments, the branched alcohol contains 17 to 32 carbon atoms, 17 to 31 carbon atoms, 17 to 30 carbon atoms, 17 to 29 carbon atoms, 17 to 28 carbon atoms, 17 to 27 carbon atoms, 17 to 26 carbon atoms, 17 to 25 carbon atoms, 17 to 24 carbon atoms, 17 to 23 carbon atoms, 17 to 22 carbon atoms, 17 to 21 carbon atoms, or 17 to 20 carbon atoms.

In some embodiments, the branched alcohol contains 18 to 32 carbon atoms, 18 to 31 carbon atoms, 18 to 30 carbon atoms, 18 to 29 carbon atoms, 18 to 28 carbon atoms, 18 to 28 carbon atoms, 18 to 26 carbon atoms, 18 to 25 carbon atoms, 18 to 24 carbon atoms, 18 to 23 carbon atoms, 18 to 22 carbon atoms, 18 to 21 carbon atoms, or 18 to 20 carbon atoms.

In some embodiments, the branched alcohol contains 19 to 32 carbon atoms, 19 to 31 carbon atoms, 19 to 30 carbon atoms, 19 to 29 carbon atoms, 19 to 28 carbon atoms, 19 to 27 carbon atoms, 19 to 26 carbon atoms, 19 to 25 carbon atoms, 19 to 24 carbon atoms, 19 to 23 carbon atoms, 19 to 22 carbon atoms, 19 to 21 carbon atoms, or 19 to 20 carbon atoms.

In some embodiments, the branched alcohol contains 20 to 32 carbon atoms, 20 to 31 carbon atoms, 20 to 30 carbon atoms, 20 to 29 carbon atoms, 20 to 28 carbon atoms, 20 to 27 carbon atoms, 20 to 26 carbon atoms, 20 to 25 carbon atoms, 20 to 24 carbon atoms, 20 to 23 carbon atoms, 20 to 22 carbon atoms, or 20 to 21 carbon atoms.

In some embodiments, the branched alcohol contains 21 to 32 carbon atoms, 21 to 31 carbon atoms, 21 to 30 carbon atoms, 21 to 29 carbon atoms, 21 to 28 carbon atoms, 21 to 27 carbon atoms, 21 to 26 carbon atoms, 21 to 25 carbon atoms, 21 to 24 carbon atoms, 21 to 23 carbon atoms, or 21 to 22 carbon atoms.

In some embodiments, the branched alcohol contains 22 to 32 carbon atoms, 22 to 31 carbon atoms, 22 to 30 carbon atoms, 22 to 29 carbon atoms, 22 to 28 carbon atoms, 22 to 27 carbon atoms, 22 to 26 carbon atoms, 22 to 25 carbon atoms, 22 to 24 carbon atoms, or 22 to 23 carbon atoms.

In some embodiments, the branched alcohol contains 23 to 32 carbon atoms, 23 to 31 carbon atoms, 23 to 30 carbon atoms, 23 to 29 carbon atoms, 23 to 28 carbon atoms, 23 to 27 carbon atoms, 23 to 26 carbon atoms, 23 to 25 carbon atoms, or 23 to 24 carbon atoms.

In some embodiments, the branched alcohol contains 24 to 32 carbon atoms, 24 to 31 carbon atoms, 24 to 30 carbon atoms, 24 to 29 carbon atoms, 24 to 28 carbon atoms, 24 to 27 carbon atoms, 24 to 26 carbon atoms, or 24 to 25 carbon atoms.

In some embodiments, the branched alcohol contains 25 to 32 carbon atoms, 25 to 31 carbon atoms, 25 to 30 carbon atoms, 25 to 29 carbon atoms, 25 to 28 carbon atoms, 25 to 27 carbon atoms, or 25 to 26 carbon atoms.

In some embodiments, the branched alcohol contains 26 to 32 atoms, 26 to 31 carbon atoms, 26 to 30 carbon atoms, 26 to 29 carbon atoms, 26 to 28 carbon atoms, or 26 to 27 carbon atoms.

In some embodiments, the branched alcohol contains 27 to 32 carbon atoms, 27 to 31 carbon atoms, 27 to 30 carbon atoms, 27 to 29 carbon atoms, or 27 to 28 carbon atoms.

In some embodiments, the branched alcohol contains 28 to 32 atoms, 28 to 31 carbon atoms, 28 to 30 carbon atoms, or 28 to 29 carbon atoms.

In some embodiments, the branched alcohol contains 29 to 32 carbon atoms, 29 to 31 carbon atoms, or 29 to 30 carbon atoms.

In some embodiments, the branched alcohol contains 30 to 32 carbon atoms, or 30 to 31 carbon atoms In some embodiments, the branched alcohol contains 31 to 32 carbon atoms.

In some embodiments, the branched alcohol is a branched $C_{16}$-$C_{32}$ alcohol, branched $C_{16}$-$C_{31}$ alcohol, branched $C_{16}$-$C_{30}$ alcohol, branched $C_{16}$-$C_{29}$ alcohol, branched $C_{16}$-$C_{28}$ alcohol, branched $C_{16}$-$C_{27}$ alcohol, branched $C_{16}$-$C_{26}$ alcohol, branched $C_{16}$-$C_{25}$ alcohol, branched $C_{16}$-$C_{24}$ alcohol, branched $C_{16}$-$C_{23}$ alcohol, branched $C_{16}$-$C_{22}$ alcohol, branched $C_{16}$-$C_{21}$ alcohol, or branched $C_{16}$-$C_{20}$ alcohol.

In some embodiments, the branched alcohol is a branched $C_{17}$-$C_{32}$ alcohol, branched $C_{17}$-$C_{31}$ alcohol, branched $C_{17}$-$C_{30}$ alcohol, branched $C_{17}$-$C_{29}$ alcohol, branched $C_{17}$-$C_{28}$ alcohol, branched $C_{17}$-$C_{27}$ alcohol, branched $C_{17}$-$C_{26}$ alcohol, branched $C_{17}$-$C_{25}$ alcohol, branched $C_{17}$-$C_{24}$ alcohol, branched $C_{17}$-$C_{23}$ alcohol, branched $C_{17}$-$C_{22}$ alcohol, branched $C_{17}$-$C_{21}$ alcohol, or branched $C_{17}$-$C_{20}$ alcohol.

In some embodiments, the branched alcohol is a branched $C_{18}$-$C_{32}$ alcohol, branched $C_{18}$-$C_{31}$ alcohol, branched $C_{18}$-$C_{30}$ alcohol, branched $C_{18}$-$C_{29}$ alcohol, branched $C_{18}$-$C_{28}$ alcohol, branched $C_{18}$-$C_{27}$ alcohol, branched $C_{18}$-$C_{26}$ alcohol, branched $C_{18}$-$C_{25}$ alcohol, branched $C_{18}$-$C_{24}$ alcohol, branched $C_{18}$-$C_{23}$ alcohol, branched $C_{18}$-$C_{22}$ alcohol, branched $C_{18}$-$C_{21}$ alcohol, or branched $C_{18}$-$C_{20}$ alcohol.

In some embodiments, the branched alcohol is a branched $C_{19}$-$C_{32}$ alcohol, branched $C_{19}$-$C_{31}$ alcohol, branched $C_{19}$-$C_{30}$ alcohol, branched $C_{19}$-$C_{29}$ alcohol, branched $C_{19}$-$C_{28}$ alcohol, branched $C_{19}$-$C_{27}$ alcohol, branched $C_{19}$-$C_{26}$ alcohol, branched $C_{19}$-$C_{25}$ alcohol, branched $C_{19}$-$C_{24}$ alcohol, branched $C_{19}$-$C_{23}$ alcohol, branched $C_{19}$-$C_{22}$ alcohol, branched $C_{19}$-$C_{21}$ alcohol, or branched $C_{19}$-$C_{20}$ alcohol.

In some embodiments, the branched alcohol is a branched $C_{20}$-$C_{32}$ alcohol, branched $C_{20}$-$C_{31}$ alcohol, branched $C_{20}$-$C_{30}$ alcohol, branched $C_{20}$-$C_{29}$ alcohol, branched $C_{20}$-$C_{28}$ alcohol, branched $C_{20}$-$C_{27}$ alcohol, branched $C_{20}$-$C_{26}$ alcohol, branched $C_{20}$-$C_{25}$ alcohol, branched $C_{20}$-$C_{24}$ alcohol, branched $C_{20}$-$C_{23}$ alcohol, branched $C_{20}$-$C_{22}$ alcohol, or branched $C_{20}$-$C_{21}$ alcohol.

In some embodiments, the branched alcohol is a branched $C_{21}$-$C_{32}$ alcohol, branched $C_{21}$-$C_{31}$ alcohol, branched $C_{21}$-$C_{30}$ alcohol, branched $C_{21}$-$C_{29}$ alcohol, branched $C_{21}$-$C_{28}$ alcohol, branched $C_{21}$-$C_{27}$ alcohol, branched $C_{21}$-$C_{26}$ alcohol, branched $C_{21}$-$C_{25}$ alcohol, branched $C_{21}$-$C_{24}$ alcohol, branched $C_{21}$-$C_{23}$ alcohol, or branched $C_{21}$-$C_{22}$ alcohol.

In some embodiments, the branched alcohol is a branched $C_{22}$-$C_{32}$ alcohol, branched $C_{22}$-$C_{31}$ alcohol, branched $C_{22}$-$C_{30}$ alcohol, branched $C_{22}$-$C_{29}$ alcohol, branched $C_{22}$-$C_{28}$ alcohol, branched $C_{22}$-$C_{27}$ alcohol, branched $C_{22}$-$C_{26}$ alcohol, branched $C_{22}$-$C_{25}$ alcohol, branched $C_{22}$-$C_{24}$ alcohol, or branched $C_{22}$-$C_{23}$ alcohol.

In some embodiments, the branched alcohol is a branched $C_{23}$-$C_{32}$ alcohol, branched $C_{23}$-$C_{31}$ alcohol, branched $C_{23}$-$C_{30}$ alcohol, branched $C_{23}$-$C_{29}$ alcohol, branched $C_{23}$-$C_{28}$ alcohol, branched $C_{23}$-$C_{27}$ alcohol, branched $C_{23}$-$C_{26}$ alcohol, branched $C_{23}$-$C_{25}$ alcohol, or branched $C_{23}$-$C_{24}$ alcohol.

In some embodiments, the branched alcohol is a branched $C_{24}$-$C_{32}$ alcohol, branched $C_{24}$-$C_{31}$ alcohol, branched $C_{24}$-$C_{30}$ alcohol, branched $C_{24}$-$C_{29}$ alcohol, branched $C_{24}$-$C_{28}$ alcohol, branched $C_{24}$-$C_{27}$ alcohol, branched $C_{24}$-$C_{26}$ alcohol, or branched $C_{24}$-$C_{25}$ alcohol.

In some embodiments, the branched alcohol is a branched $C_{25}$-$C_{32}$ alcohol, branched $C_{25}$-$C_{31}$ alcohol, branched $C_{25}$-$C_{30}$ alcohol, branched $C_{25}$-$C_{29}$ alcohol, branched $C_{25}$-$C_{28}$ alcohol, branched $C_{25}$-$C_{27}$ alcohol, or branched $C_{25}$-$C_{26}$ alcohol.

In some embodiments, the branched alcohol is a branched $C_{26}$-$C_{32}$ alcohol, branched $C_{26}$-$C_{31}$ alcohol, branched $C_{26}$-$C_{30}$ alcohol, branched $C_{26}$-$C_{29}$ alcohol, branched $C_{26}$-$C_{28}$ alcohol, or branched $C_{26}$-$C_{27}$ alcohol.

In some embodiments, the branched alcohol is a branched $C_{27}$-$C_{32}$ alcohol, branched $C_{27}$-$C_{31}$ alcohol, branched $C_{27}$-$C_{30}$ alcohol, branched $C_{27}$-$C_{29}$ alcohol, or branched $C_{27}$-$C_{28}$ alcohol.

In some embodiments, the branched alcohol is a branched $C_{28}$-$C_{32}$ alcohol, branched $C_{28}$-$C_{31}$ alcohol, branched $C_{28}$-$C_{30}$ alcohol, or branched $C_{28}$-$C_{29}$ alcohol.

In some embodiments, the branched alcohol is a branched $C_{29}$-$C_{32}$ alcohol, branched $C_{29}$-$C_{31}$ alcohol, or branched $C_{29}$-$C_{30}$ alcohol.

In some embodiments, the branched alcohol is a branched $C_{30}$-$C_{32}$ alcohol, or branched $C_{30}$-$C_{31}$ alcohol.

In some embodiments, the branched alcohol is a branched $C_{31}$-$C_{32}$ alcohol.

In some embodiments, the branched alcohol is a branched $C_{16}$ alcohol. In some embodiments, the branched alcohol is a branched $C_{17}$ alcohol. In some embodiments, the branched alcohol is a branched $C_{18}$ alcohol. In some embodiments, the branched alcohol is a branched $C_{19}$ alcohol. In some embodiments, the branched alcohol is a branched $C_{20}$ alcohol. In some embodiments, the branched alcohol is a branched $C_{21}$ alcohol. In some embodiments, the branched alcohol is a branched $C_{22}$ alcohol. In some embodiments, the branched alcohol is a branched $C_{23}$ alcohol. In some embodiments, the branched alcohol is a branched $C_{24}$ alcohol. In some embodiments, the branched alcohol is a branched $C_{25}$ alcohol. In some embodiments, the branched alcohol is a branched $C_{26}$ alcohol. In some embodiments, the branched alcohol is a branched $C_{27}$ alcohol. In some embodiments, the branched alcohol is a branched $C_{28}$ alcohol. In some embodiments, the branched alcohol is a branched $C_{29}$ alcohol. In some embodiments, the branched alcohol is a branched $C_{30}$ alcohol. In some embodiments, the branched alcohol is a branched $C_{31}$ alcohol. In some embodiments, the branched alcohol is a branched $C_{32}$ alcohol.

In some embodiments, the branched alcohol is represented by the structure of Formula (II):

$$(R^4)(R^5)CHCH_2OH \qquad \text{Formula (II)},$$

where
R⁴ is —CH$_2$(CH$_2$)$_m$CH$_3$;
R⁵ is —CH$_2$(CH$_2$)$_n$CH$_3$
m is 6 to 22; and
n is 4 to 13,
wherein $10 \leq m+n \leq 26$.

In some embodiments, m is 6 to 8, n is 4 to 6, and $10 \leq m+n \leq 14$.

In some embodiments, the branched $C_{16}$-$C_{32}$ alcohol has the structure of Formula (II).

In some embodiments, the branched $C_{16}$-$C_{20}$ alcohol has the structure of Formula (II).

In some embodiments, one or more hydrogen atoms of the branched alcohol having the structure of Formula (II) can be optionally substituted by a substituent. In some embodiments, one or more hydrogen atoms connected to the carbon atoms of the branched alcohol having the structure of Formula (II) can be optionally substituted by a substituent. In some embodiments, at least one hydrogen atom of the branched alcohol having the structure of Formula (II) can be optionally substituted by a substituent. In some embodiments, at least one hydrogen atom connected to the carbon atoms of the branched alcohol having the structure of Formula (II) can be optionally substituted by a substituent.

In some embodiments, the branched alcohol represented by structure of Formula (II) is known as a Guerbet alcohol. For example, in some embodiments, branched alcohols of Formula (II) containing 12 to 32 carbon atoms are commercially available under the Isofol® trademark (available from Sasol). Isofol® 18T is a mixture of branched alcohols comprising (i) 23-27 weight percent of 2-hexyl-1-dodecanol; (ii) 27-33 weight percent of 2-octyl-1-dodecanol; (iii) 23-27 weight percent of 2-octyl-1-decanol; and (iv) 15-20 weight percent of 2-hexyl-1-decanol. Isofol® 16 comprises 2-hexyl-1-decanol. Isofol® 20 comprises 2-octyl-1-dodecanol. Isofol® 24 comprises 2-decyl-1-tetradecanol. Isofol® 28 comprises 2-dodecyl-1-hexadecanol. Isofol® 32 comprises 2-tetradecyl-1-octadecanol.

In various embodiments, one or more branched alcohols containing 16 to 32 carbon atoms (i.e., branched $C_{16}$-$C_{32}$ alcohol) can be reacted with an acrylic acid (e.g., 2-propenoic acid or 2-methylpropenoic acid) under conditions suitable for esterification conditions known in the art to prepare the one or more acrylic esters of a branched $C_{16}$-$C_{32}$ alcohol. In various embodiments, one or more branched alcohols containing 16 to 20 carbon atoms (i.e., branched $C_{16}$-$C_{20}$ alcohol) can be reacted with an acrylic acid (e.g., 2-propenoic acid or 2-methylpropenoic acid) under conditions suitable for esterification conditions known in the art to prepare the one or more acrylic esters of a branched $C_{16}$-$C_{20}$ alcohol. 2-Propenoic acid is also known as acrylic acid. 2-methylpropenoic acid is also known as methacrylic acid.

In various embodiments, at least one branched alcohol containing 16 to 32 carbon atoms (i.e., branched $C_{16}$-$C_{32}$ alcohol) can be reacted with an acrylic acid (e.g., 2-propenoic acid or 2-methylpropenoic acid) under conditions suitable for esterification conditions known in the art to prepare at least one acrylic ester of a branched $C_{16}$-$C_{32}$ alcohol. In various embodiments, at least one branched alcohol containing 16 to 20 carbon atoms (i.e., branched $C_{16}$-$C_{20}$ alcohol) can be reacted with an acrylic acid (e.g., 2-propenoic acid or 2-methylpropenoic acid) under conditions suitable for esterification conditions known in the art to prepare at least one acrylic esters of a branched $C_{16}$-$C_{20}$ alcohol. 2-Propenoic acid is also known as acrylic acid. 2-methylpropenoic acid is also known as methacrylic acid.

In some embodiments, the acrylic ester of a branched alcohol has the structure of Formula (III):

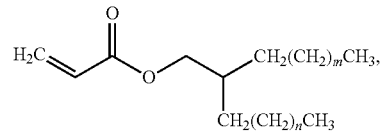

Formula (III)

where,
m is 6 to 22; and
n is 4 to 13, wherein $10 \leq m+n \leq 26$.

In some embodiments, m is 6 to 8, n is 4 to 6, and $10 \leq m+n \leq 14$.

In some embodiments, the acrylic ester of a branched $C_{16}$-$C_{32}$ alcohol has the structure of Formula (III). In some embodiments, the acrylic ester of a branched $C_{16}$-$C_{20}$ alcohol has the structure of Formula (III).

In some embodiments, one or more hydrogen atoms of the acrylic ester of a branched alcohol having the structure of Formula (III) can be optionally substituted by a substituent.

In some embodiments, the acrylic ester of a branched alcohol has the structure of Formula (IV):

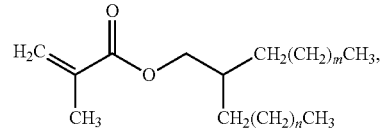

Formula (IV)

where,
m is 6 to 22; and
n is 4 to 13, wherein $10 \leq m+n \leq 26$.

In some embodiments, m is 6 to 8, n is 4 to 6, and $10 \leq m+n \leq 14$.

In some embodiments, the acrylic ester of a branched $C_{16}$-$C_{32}$ alcohol has the structure of Formula (IV). In some embodiments, the acrylic ester of a branched $C_{16}$-$C_{20}$ alcohol has the structure of Formula (IV).

In some embodiments, one or more hydrogen atoms of the acrylic ester of a branched alcohol having the structure of Formula (IV) can be optionally substituted by a substituent.

In some embodiments, acrylic esters of a branched alcohol are acrylic esters of a branched $C_{16}$-$C_{32}$ alcohol. In some embodiments, acrylic esters of a branched alcohol are acrylic esters of a branched $C_{16}$-$C_{20}$ alcohol. Further, the branched alcohol can be a saturated or unsaturated alcohol. In some embodiments the branched alcohol is a saturated alcohol. In some embodiments, the branched alcohol is an unsaturated alcohol. In some embodiments, the branched alcohol is optionally substituted. In some embodiments, the branched $C_{16}$-$C_{32}$ alcohol is optionally substituted. In some embodiments, the branched $C_{16}$-$C_{20}$ alcohol is optionally substituted.

In some embodiments, the acrylic ester of a branched $C_{16}$-$C_{32}$ alcohol is optionally substituted. In some embodiments, the acrylic ester of a branched $C_{16}$-$C_{20}$ alcohol is optionally substituted.

In some embodiments, the branched alcohol is a Guerbet alcohol comprising 16 to 32 carbon atoms. In some embodiments, the branched alcohol is a Guerbet alcohol comprising 16 to 20 carbon atoms.

In some embodiments, without limitations the branch portion of the branched alcohol can range from 1 carbon to 15 carbons. In some embodiments, the branch portion of the branched alcohol has 4, 5, 6, 7, 8 or 9 carbon atoms. In some embodiments, the branch portion of the branched alcohol comprises 6 or 8 carbon atoms.

Some exemplary branched $C_{16}$-$C_{20}$ alcohols include, but are not limited to, 2-hexyl-1-dodecanol, 2-octyl-1-dodecanol, 2-octyl-1-decanol and/or 2-hexyl-1-decanol.

Some exemplary branched $C_{16}$-$C_{32}$ alcohols include, but are not limited to, 2-hexyl-1-dodecanol, 2-octyl-1-dodecanol, 2-octyl-1-decanol, and/or 2-hexyl-1-decanol.

Some exemplary branched $C_{16}$-$C_{32}$ alcohols include, but are not limited to, 2-hexyl-1-dodecanol, 2-octyl-1-dodecanol, 2-octyl-1-decanol, 2-hexyl-1-decanol, 2-decyl-1-tetradecanol, 2-dodecyl-1-hexadecanol, and/or 2-tetradecyl-1-octadecanol.

In some embodiments, the acrylic ester of a branched $C_{16}$-$C_{20}$ alcohol is selected from the group consisting of 2-propenoic acid 2-hexyldodecyl ester, 2-propenoic acid 2-octyldodecyl ester, 2-propenoic acid 2-octyldecyl ester, 2-hexyldecyl ester and any combinations or mixtures thereof. In some embodiments the acrylic ester of a branched $C_{16}$-$C_{20}$ alcohol is a mixture comprising at least two (e.g., two, three or all four) of 2-propenoic acid 2-hexyldodecyl ester, 2-propenoic acid 2-octyldodecyl ester, 2-propenoic acid 2-octyldecyl ester and 2-propenoic acid 2-hexyldecyl ester.

In some embodiments, the at least one acrylic ester of a branched $C_{16}$-$C_{20}$ alcohol is a mixture comprising any two of: (i) from about 23 to about 27 by weight percent of 2-propenoic acid 2-hexyldodecyl ester; (ii) from about 27 to about 33 by weight percent of 2-propenoic acid 2-octyldodecyl ester; (iii) from about 23 to about 27 by weight percent of 2-propenoic acid 2-octyldecyl ester; and (iv) from about 15 to about 20 by weight percent of 2-propenoic acid 2-hexyldecyl ester.

In some embodiments, the at least one acrylic ester of a branched $C_{16}$-$C_{20}$ alcohol is a mixture comprising any three of: (i) from about 23 to about 27 by weight percent of 2-propenoic acid 2-hexyldodecyl ester; (ii) from about 27 to about 33 by weight percent of 2-propenoic acid 2-octyldodecyl ester; (iii) from about 23 to about 27 by weight percent of 2-propenoic acid 2-octyldecyl ester; and (iv) from about 15 to about 20 by weight percent of 2-propenoic acid 2-hexyldecyl ester.

In some embodiments, the acrylic ester of at least one branched $C_{16}$-$C_{20}$ alcohol is a mixture comprising: (i) from about 23 to about 27 by weight percent of 2-propenoic acid 2-hexyldodecyl ester; (ii) from about 27 to about 33 by weight percent of 2-propenoic acid 2-octyldodecyl ester; (iii) from about 23 to about 27 by weight percent of 2-propenoic acid 2-octyldecyl ester; and (iv) from about 15 to about 20 by weight percent of 2-propenoic acid 2-hexyl dec yl ester.

In some embodiments, the acrylic ester of a branched $C_{16}$-$C_{32}$ alcohol is a monomer. In some embodiments, the acrylic ester of a branched $C_{16}$-$C_{20}$ alcohol is a monomer.

Generally, the acrylic ester of a branched $C_{16}$-$C_{32}$ alcohol may be in any physical form. For example, in some embodiments, the acrylic ester of a branched $C_{16}$-$C_{32}$ alcohol may be a gas, a liquid, a solid, a semi-solid, etc. Generally, the acrylic ester of a branched $C_{16}$-$C_{20}$ alcohol may be in any physical form. For example, in some embodiments, the acrylic ester of a branched $C_{16}$-$C_{20}$ alcohol may be a gas, a liquid, a solid, a semi-solid, etc.

2-propenoic acid 2-hexyldodecyl ester is also known as 2-hexyldodecyl acrylate.

2-propenoic acid 2-octyldodecyl ester is also known as 2-octyldodecyl acrylate.

2-propenoic acid 2-octyldecyl ester is also known as 2-octyldecyl acrylate.

2-propenoic acid 2-hexyldecyl ester is also known as 2-hexyldecyl acrylate.

In some embodiments, the acrylic ester of a branched $C_{16}$-$C_{32}$ alcohol is derived from Isofol® 18T. In some embodiments, the acrylic ester of a branched $C_{16}$-$C_{20}$ alcohol is derived from Isofol® 18T. In some embodiments, the acrylic ester of a branched $C_{16}$-$C_{32}$ alcohol is derived from Isofol® 16, Isofol® 18T, Isofol® 20, Isofol® 24, Isofol® 28, Isofol® 32, or any combinations or mixtures thereof. In some embodiments, the acrylic ester of a branched $C_{16}$-$C_{20}$ alcohol is derived from Isofol® 16, Isofol® 18T, Isofol® 20, or any combinations or mixtures thereof.

Alkene Monomer

In addition to the at least one vinyl ester, and the at least one acrylic ester of a branched $C_{16}$-$C_{32}$ alcohol, the polymer and/or monomer composition can optionally further comprise at least one monomer comprising a double bond, i.e., an alkene. Exemplary alkenes include, but are not limited to, ethylene, propylene, 1-butene, 2-butene, 1-pentene, 2-pentene, isopentene, hexene-1,2-hexene, 3-hexene, 4-methylpentene-1,2-methylpentene-1,4-methylbutene-1,1-heptene, 2-heptene, 3-heptene, 1-octene, 2-octene, 2-methylheptene-1,4-octene, 3,4-dimethyl-3-hexene, 1-decene, 1-dodecene, 1,3-butadiene, 1,3-pentadiene, 1,4-pentadiene, 1,3-hexadiene, 1,4-hexadiene, 1,5-hexadiene, 1,3-cyclohexadiene, 1,4-cyclohexadiene, 1,9-decadiene 1,13-tetradecadiene, 2,6-dimethyl-1,5-heptadiene, 2-methyl-2,7-octadiene, 2,7-dimethyl-2,6-octadiene, and 2,3-dimethylbutadiene. In some embodiments, the alkene is ethylene.

When present, the amount of the at least one alkene in the polymer of the invention can range from about 5 to about 40 percent by weight of the total weight of the polymer. In some embodiments, the amount of the at least one alkene in the polymer of the invention can range from about 10 to about 20 percent by weight of the total weight of the polymer. In some embodiments, the amount of the at least one alkene in the polymer of the invention can range from about 13 to about 18 percent by weight of the total weight of the polymer.

In some embodiments, the polymer optionally further comprises 5 to 40 percent by weight of at least one alkene. In some embodiments, the polymer optionally further comprises 5 to 40, 5 to 35, 5 to 30, 5 to 25, 5 to 20, 5 to 18, 5 to 15, 5 to 13, or 5 to 10 weight percent of at least one alkene. In some embodiments, the polymer optionally further comprises 10 to 40, 10 to 35, 10 to 30, 10 to 25, 10 to 20, 10 to 18, 10 to 15, or 10 to 13 weight percent of at least one alkene.

In some embodiments, the polymer optionally further comprises 13 to 40, 13 to 35, 13 to 30, 13 to 25, 13 to 20, 13 to 18, to 13 to 15 weight percent of at least one alkene.

In some embodiments, the polymer optionally further comprises 15 to 40, 15 to 35, 15 to 30, 15 to 25, 15 to 20, or 15 to 18 weight percent of at least one alkene.

In some embodiments, the polymer optionally further comprises 18 to 40, 18 to 35, 18 to 30, 18 to 25, or 18 to 20 weight percent of at least one alkene.

In some embodiments, the polymer optionally further comprises 20 to 40, 20 to 35, 20 to 30, or 20 to 25 weight percent of at least one alkene. In some embodiments, the polymer optionally further comprises 25 to 40, 25 to 35, or 25 to 30 weight percent of at least one alkene. In some embodiments, the polymer optionally further comprises 30 to 40, or 35 to 40 weight percent of at least one alkene.

In some embodiments, the polymer optionally further comprises 35 to 40 weight percent of at least one alkene.

In some embodiments, the percent by weight of at least one alkene is based on the total weight of the polymer. In some embodiments, the polymer optionally comprises at least two alkenes, wherein the two alkenes are different.

In some embodiments, the alkene is a monomer. Generally, the alkene may be in any physical form. For example, in some embodiments the alkene may be a gas, a liquid, a solid, a semi-solid, etc.

Additional Acrylic Ester Monomer (Acrylic Ester of a $C_5$-$C_{13}$ Alcohol)

In addition to the at least one vinyl ester, and the at least one acrylic ester of a branched $C_{16}$-$C_{32}$ alcohol, the polymer and/or monomer composition can optionally further comprise at least one acrylic ester of a $C_5$-$C_{13}$ alcohol. Without limitations, the acrylic ester of the $C_5$-$C_{13}$ alcohol can be an acrylate ester or a methacrylate ester. In some embodiments, the acrylic ester of the $C_5$-$C_{13}$ alcohol is an acrylate ester. In some embodiments, the acrylic ester of the $C_5$-$C_{13}$ alcohol is a methacrylate ester. In some embodiments, the $C_5$-$C_{13}$ alcohol is optionally substituted. In some embodiments, the $C_5$-$C_{13}$ alcohol is a branched $C_5$-$C_{13}$ alcohol. In some embodiments, the $C_5$-$C_{13}$ alcohol is a straight chain $C_5$-$C_{13}$ alcohol. In some embodiments, the $C_5$-$C_{13}$ alcohol is an unbranched $C_5$-$C_{13}$ alcohol. In some embodiments, the acrylic ester of a $C_5$-$C_{13}$ alcohol is lauryl acrylate.

If present, the amount of the at least one acrylic ester of a $C_5$-$C_{13}$ alcohol in the polymer can range from about 0.5 to about 20 percent, or from about 10 to about 20 percent, by weight of the total weight of the polymer.

In some embodiments, the polymer optionally further comprises 0 to 20 percent by weight of at least one acrylic ester of a $C_5$-$C_{13}$ alcohol. In some embodiments, the polymer optionally further comprises 0.5 to 20, 0.5 to 15, 0.5 to 10, 0.5 to 5, 0.5 to 2.5, or 0.5 to 1 weight percent of at least one acrylic ester of a $C_5$-$C_{13}$ alcohol.

In some embodiments, the polymer optionally further comprises 1 to 20, 1 to 15, 1 to 10, 1 to 5, or 1 to 2.5 weight percent of at least one acrylic ester of a $C_5$-$C_{13}$ alcohol.

In some embodiments, the polymer optionally further comprises 2.5 to 20, 2.5 to 15, 2.5 to 10, or 2.5 to 5 weight percent of at least one acrylic ester of a $C_5$-$C_{13}$ alcohol.

In some embodiments, the polymer optionally further comprises 5 to 20, 5 to 15, or 5 to 10 weight percent of at least one acrylic ester of a $C_5$-$C_{13}$ alcohol.

In some embodiments, the polymer optionally further comprises 10 to 20, or 10 to 15 weight percent of at least one acrylic ester of a $C_5$-$C_{13}$ alcohol.

In some embodiments, the polymer optionally further comprises 15 to 20 weight percent of at least one acrylic ester of a $C_5$-$C_{13}$ alcohol.

In some embodiments, the percent by weight of at least one acrylic ester of a $C_5$-$C_{13}$ alcohol is based on the total weight of the polymer.

In some embodiments, the at least one acrylic ester of a $C_5$-$C_{13}$ alcohol is a mixture of at least two acrylic esters of a $C_5$-$C_{13}$ alcohols, wherein at least two of the acrylic esters are different.

In some embodiments, the acrylic ester of a $C_5$-$C_{13}$ alcohol is a monomer. Generally, the acrylic ester of a $C_5$-$C_{13}$ alcohol may be in any physical form. For example, in some embodiments the acrylic ester of a $C_5$-$C_{13}$ alcohol may be a gas, a liquid, a solid, a semi-solid, etc.

Monomer Compositions of the Invention

In various embodiments, the invention provides a monomer composition, comprising: at least one vinyl ester; and at least one acrylic ester of a branched alcohol, wherein the branched alcohol is a branched $C_{16}$-$C_{32}$ alcohol. In some embodiments, the branched alcohol is a branched $C_{16}$-$C_{20}$ alcohol. In some embodiments, the monomer composition optionally further comprises at least one alkene. In some embodiments, the monomer composition optionally further comprises at least one acrylic ester of a $C_5$-$C_{13}$ alcohol. In some embodiments, the monomer composition comprises from about 60 to about 97 percent by weight of the at least one vinyl ester. In some embodiments, the monomer composition comprises from about 0.5 to about 20 percent by weight of the at least one acrylic ester of a branched $C_{16}$-$C_{32}$ alcohol. In some embodiments, the monomer composition comprises from about 0.5 to about 20 percent by weight of the at least one acrylic ester of a branched $C_{16}$-$C_{20}$ alcohol. In some embodiments, the monomer composition comprises from about 0 to about 40 percent by weight of the at least one alkene. In some embodiments, the monomer composition comprises from about 0 to 20 percent by weight of at least one acrylic ester of a $C_5$-$C_{13}$ alcohol.

In various embodiments, the invention provides a monomer composition, comprising: at least one vinyl ester; and at least one acrylic ester of a branched alcohol, wherein the branched alcohol is a branched $C_{16}$-$C_{20}$ alcohol. In some embodiments, the monomer composition optionally further comprises at least one alkene. In some embodiments, the monomer composition optionally further comprises at least one acrylic ester of a $C_5$-$C_{13}$ alcohol. In some embodiments, the monomer composition comprises from about 60 to about 97 percent by weight of the at least one vinyl ester. In some embodiments, the monomer composition comprises from about 0.5 to about 20 percent by weight of the at least one acrylic ester of a branched $C_{16}$-$C_{20}$ alcohol. In some embodiments, the monomer composition comprises from about 0 to about 40 percent by weight of the at least one alkene. In some embodiments, the monomer composition comprises from about 0 to 20 percent by weight of at least one acrylic ester of a $C_5$-$C_{13}$ alcohol.

Generally, in various embodiments of the invention, the amount of the at least one vinyl ester in the monomer composition can be any desired amount. In some embodiments, the amount of at least one vinyl ester in the monomer composition ranges from about 60 to about 97 percent by weight of the total weight of the monomer composition. In some embodiments, the amount of at least one vinyl ester in the monomer composition ranges from about 75 to about 95 percent by weight of the total weight of the monomer composition.

In some embodiments, the monomer composition comprises 60 to 97, 60 to 95, 60 to 90, 60 to 85, 60 to 80, 60 to 75, 60 to 70, or 60 to 65 percent by weight of at least one vinyl ester. In some embodiments, the monomer composition comprises 65 to 97, 65 to 95, 65 to 90, 65 to 85, 65 to 80, 65 to 75, or 65 to 70 percent by weight of at least one vinyl ester. In some embodiments, the monomer composition comprises 70 to 97, 70 to 95, 70 to 90, 70 to 85, 70 to 80, or 70 to 75 percent by weight of at least one vinyl ester. In some embodiments, the monomer composition comprises 75 to 97, 75 to 95, 75 to 90, 75 to 85, or 75 to 80 percent by weight of at least one vinyl ester. In some embodiments, the monomer composition comprises 80 to 97, 80 to 95, 80 to 90, or 80 to 85 percent by weight of at least one vinyl ester. In some embodiments, the monomer composition comprises 85 to 97, 85 to 95, or 85 to 90 percent by weight of at least one vinyl ester. In some embodiments, the monomer composition comprises 90 to 97 or 90 to 95 percent by weight of at least one vinyl ester. In some embodiments, the percent by weight of at least one vinyl ester is based on the total weight of the monomer composition. In some embodiments, the at least one vinyl ester is at least two vinyl esters, wherein at least two of the vinyl esters are different.

Generally, in various embodiments of the invention, the amount of the at least one acrylic ester of the branched $C_{16}$ to $C_{32}$ alcohol in the monomer composition can be any desired amount. In some embodiments, the amount of at least one acrylic ester of a branched $C_{16}$ to $C_{32}$ alcohol ranges from about 0.5 to about 20 percent by weight of the total weight of the monomer composition. In some embodiments, the monomer composition comprises 0.5 to 20, 0.5 to 15, 0.5 to 10, 0.5 to 5, 0.5 to 3, 0.5 to 2, or 0.5 to 1 percent by weight of at least one acrylic ester of a branched alcohol, wherein the branched alcohol is a branched $C_{16}$-$C_{32}$ alcohol.

In some embodiments, the monomer composition comprises 1 to 20, 1 to 15, 1 to 10, 1 to 5, 1 to 3, or 1 to 2 percent by weight of at least one acrylic ester of a branched alcohol, wherein the branched alcohol is a branched $C_{16}$-$C_{32}$ alcohol.

In some embodiments, the monomer composition comprises 2 to 20, 2 to 15, 2 to 10, 2 to 5, or 2 to 3 percent by weight of at least one acrylic ester of a branched alcohol, wherein the branched alcohol is a branched $C_{16}$-$C_{32}$ alcohol.

In some embodiments, the monomer composition comprises 3 to 20, 3 to 15, 3 to 10, or 3 to 5 percent by weight of at least one acrylic ester of a branched alcohol, wherein the branched alcohol is a branched $C_{16}$-$C_{32}$ alcohol.

In some embodiments, the monomer composition comprises 5 to 20, 5 to 15 or 5 to 10 percent by weight of at least one acrylic ester of a branched alcohol, wherein the branched alcohol is a branched $C_{16}$-$C_{32}$ alcohol.

In some embodiments, the monomer composition comprises 10 to 20 or 10 to 15 percent by weight of at least one acrylic ester of a branched alcohol, wherein the branched alcohol is a branched $C_{16}$-$C_{32}$ alcohol.

In some embodiments, the monomer composition comprises 15 to 20 percent by weight of at least one acrylic ester of a branched alcohol, wherein the branched alcohol is a branched $C_{16}$-$C_{32}$ alcohol.

In some embodiments, the percent by weight of at least one acrylic ester of a branched alcohol, wherein the branched alcohol is a branched $C_{16}$-$C_{32}$ alcohol, is based on the total weight of the monomer composition.

In some embodiments, the branched alcohol is a branched $C_{16}$-$C_{20}$ alcohol.

Generally, in various embodiments of the invention, the amount of the at least one acrylic ester of the branched $C_{16}$ to $C_{20}$ alcohol in the monomer composition can be any desired amount. In some embodiments, the amount of at least one acrylic ester of a branched $C_{16}$ to $C_{20}$ alcohol ranges from about 0.5 to about 20 percent by weight of the total weight of the monomer composition. In some embodiments, the monomer composition comprises 0.5 to 20, 0.5 to 15, 0.5 to 10, 0.5 to 5, 0.5 to 3, 0.5 to 2, or 0.5 to 1 percent by weight of at least one acrylic ester of a branched alcohol, wherein the branched alcohol is a branched $C_{16}$-$C_{20}$ alcohol.

In some embodiments, the monomer composition comprises 1 to 20, 1 to 15, 1 to 10, 1 to 5, 1 to 3, or 1 to 2 percent by weight of at least one acrylic ester of a branched alcohol, wherein the branched alcohol is a branched $C_{16}$-$C_{20}$ alcohol.

In some embodiments, the monomer composition comprises 2 to 20, 2 to 15, 2 to 10, 2 to 5, or 2 to 3 percent by weight of at least one acrylic ester of a branched alcohol, wherein the branched alcohol is a branched $C_{16}$-$C_{20}$ alcohol.

In some embodiments, the monomer composition comprises 3 to 20, 3 to 15, 3 to 10, or 3 to 5 percent by weight of at least one acrylic ester of a branched alcohol, wherein the branched alcohol is a branched $C_{16}$-$C_{20}$ alcohol.

In some embodiments, the monomer composition comprises 5 to 20, 5 to 15 or 5 to 10 percent by weight of at least one acrylic ester of a branched alcohol, wherein the branched alcohol is a branched $C_{16}$-$C_{20}$ alcohol.

In some embodiments, the monomer composition comprises 10 to 20 or 10 to 15 percent by weight of at least one acrylic ester of a branched alcohol, wherein the branched alcohol is a branched $C_{16}$-$C_{20}$ alcohol.

In some embodiments, the monomer composition comprises 15 to 20 percent by weight of at least one acrylic ester of a branched alcohol, wherein the branched alcohol is a branched $C_{16}$-$C_{20}$ alcohol.

In some embodiments, the percent by weight of at least one acrylic ester of a branched alcohol, wherein the branched alcohol is a branched $C_{16}$-$C_{20}$ alcohol, is based on the total weight of the monomer composition.

When present, the amount of the at least one alkene in the monomer compositions can range from about 5 to about 40 percent by weight of the total weight of the monomer composition. In some embodiments, the amount of the at least one alkene in the monomer composition can range from about 10 to about 20 percent by weight of the total weight of the monomer composition. In some embodiments, the amount of the at least one alkene in the monomer composition can range from about 13 to about 18 percent by weight of the total weight of the monomer composition.

In some embodiments, the monomer composition optionally further comprises 0 to 40 percent by weight of at least one alkene. In some embodiments, the monomer composition optionally further comprises 5 to 40, 5 to 35, 5 to 30, 5 to 25, 5 to 20, 5 to 18, 5 to 15, 5 to 13, or 5 to 10 weight percent of at least one alkene. In some embodiments, the monomer composition optionally further comprises 10 to 40, 10 to 35, 10 to 30, 10 to 25, 10 to 20, 10 to 18, 10 to 15, or 10 to 13 weight percent of at least one alkene.

In some embodiments, the monomer composition optionally further comprises 13 to 40, 13 to 35, 13 to 30, 13 to 25, 13 to 20, 13 to 18, to 13 to 15 weight percent of at least one alkene.

In some embodiments, the monomer composition optionally further comprises 15 to 40, 15 to 35, 15 to 30, 15 to 25, 15 to 20, or 15 to 18 weight percent of at least one alkene.

In some embodiments, the monomer composition optionally further comprises 18 to 40, 18 to 35, 18 to 30, 18 to 25, or 18 to 20 weight percent of at least one alkene.

In some embodiments, the monomer composition optionally further comprises 20 to 40, 20 to 35, 20 to 30, or 20 to 25 weight percent of at least one alkene. In some embodiments, the monomer composition optionally further comprises 25 to 40, 25 to 35, or 25 to 30 weight percent of at least one alkene. In some embodiments, the monomer composition optionally further comprises 30 to 40, or 35 to 40 weight percent of at least one alkene.

In some embodiments, the monomer composition optionally further comprises 35 to 40 weight percent of at least one alkene.

In some embodiments, the percent by weight of at least one alkene is based on the total weight of the monomer composition. In some embodiments, the monomer composition optionally comprises at least two alkenes, wherein the two alkenes are different.

In some embodiments, the alkene is a monomer. Generally, the alkene may be in any physical form. For example, in some embodiments the alkene may be a gas, a liquid, a solid, a semi-solid, etc.

If present, the amount of the at least one acrylic ester of a $C_5$-$C_{13}$ alcohol in the monomer composition can range from about 0.5 to about 20 percent, or from about 10 to about 20 percent, by weight of the total weight of the monomer composition.

In some embodiments, the monomer composition optionally further comprises 0 to 20 percent by weight of at least one acrylic ester of a $C_5$-$C_{13}$ alcohol. In some embodiments, the monomer composition optionally further comprises 0.5 to 20, 0.5 to 15, 0.5 to 10, 0.5 to 5, 0.5 to 2.5, or 0.5 to 1 weight percent of at least one acrylic ester of a $C_5$-$C_{13}$ alcohol.

In some embodiments, the monomer composition optionally further comprises 1 to 20, 1 to 15, 1 to 10, 1 to 5, or 1 to 2.5 weight percent of at least one acrylic ester of a $C_5$-$C_{13}$ alcohol.

In some embodiments, the monomer composition optionally further comprises 2.5 to 20, 2.5 to 15, 2.5 to 10, or 2.5 to 5 weight percent of at least one acrylic ester of a $C_5$-$C_{13}$ alcohol.

In some embodiments, the monomer composition optionally further comprises 5 to 20, 5 to 15, or 5 to 10 weight percent of at least one acrylic ester of a $C_5$-$C_{13}$ alcohol.

In some embodiments, the monomer composition optionally further comprises 10 to 20, or 10 to 15 weight percent of at least one acrylic ester of a $C_5$-$C_{13}$ alcohol.

In some embodiments, the monomer composition optionally further comprises 15 to 20 weight percent of at least one acrylic ester of a $C_5$-$C_{13}$ alcohol.

In some embodiments, the percent by weight of at least one acrylic ester of a $C_5$-$C_{13}$ alcohol is based on the total weight of the monomer composition.

In some embodiments, the at least one acrylic ester of a $C_5$-$C_{13}$ alcohol is a mixture of at least two acrylic esters of a $C_5$-$C_{13}$ alcohols, wherein at least two of the acrylic esters are different.

In some embodiments, the acrylic ester of a $C_5$-$C_{13}$ alcohol is a monomer. Generally, the acrylic ester of a $C_5$-$C_{13}$ alcohol may be in any physical form. For example, in some embodiments the acrylic ester of a $C_5$-$C_{13}$ alcohol may be a gas, a liquid, a solid, a semi-solid, etc.

Generally, the choice of monomers or the choice of the proportions by weight of the comonomers is made so that the polymer of the invention has one or more desired characteristics. For example, in some embodiments the monomers and/or the proportion by weight of the comonomers is such that the polymer of the invention has a glass transition temperature Tg of from about 10° C. to about 55° C. In some embodiments, the monomers and/or the proportion by weight of the comonomers is such that the polymer of the invention has a glass transition temperature Tg of from about 15° C. to about 50° C. In some embodiments, the polymers of the invention have a Tg of 10° C. to 55° C., 10° C. to 50° C., 10° C. to 45° C., 10° C. to 40° C., 10° C. to 35° C., 10° C. to 30° C., 10° C. to 25° C., 10° C. to 20° C., 10° C. to 15° C., 15° C. to 55° C., 15° C. to 50° C., 15° C. to 45° C., 15° C. to 40° C., 15° C. to 35° C., 15° C. to 30° C., 15° C. to 25° C., 15° C. to 20° C., 20° C. to 55° C., 20° C. to 50° C., 20° C. to 45° C., 20° C. to 40° C., 20° C. to 35° C., 20° C. to 30° C., 20° C. to 25° C., 25° C. to 55° C., 25° C. to 50° C., 25° C. to 45° C., 25° C. to 40° C., 25° C. to 35° C., 25° C. to 30° C., 30° C. to 55° C., 30° C. to 50° C., 30° C. to 45° C., 30° C. to 40° C., 30° C. to 35° C., 35° C. to 55° C., 35° C. to 50° C., 35° C. to 45° C., 35° C. to 40° C., 40° C. to 55° C., 40° C. to 50° C., 40° C. to 45° C., 45° C. to 55° C., 45° C. to 50° C., or 50° C. to 55° C.

The glass transition temperature Tg of the polymers of the invention can be determined in a known manner by means of differential scanning calorimetry (DSC). The Tg can also be calculated approximately beforehand by means of the following Fox equation:

$$1/Tg = x_1/Tg_1 + x_2/Tg_2 + \ldots + x_n/Tg_n \qquad \text{(Equation I)}$$

In the above equation, xn is the mass fraction (% by weight/100) of the monomer n and Tgn is the glass transition temperature in Kelvin of the homopolymer of the monomer n. (Fox T. G., Bull. Am. Physics Soc. 1, 3, page 123 (1956)). Tg values for homopolymers are given in POLYMER HANDBOOK 2nd Edition, J. Wiley & Sons, New York (1975).

In another example, in some embodiments the choice of monomers and/or the proportion by weight of the comonomers is such that the polymer of the invention has 14 day water absorption in the range of about 1.8 $g/cm^2$ to less than 2.7 $g/cm^2$. In some embodiments, the choice of monomers and/or the proportion by weight of the comonomers is such that the polymer of the invention has 14 day water absorption in the range of greater than 1.8 $g/cm^2$ to 2.7 $g/cm^2$. It should be understood that the lower or upper end points could be any of 1.80, 1.85, 1.90, 1.95, 2.00, 2.05, 2.10, 2.15, 2.20, 2.25, 2.30, 2.35, 2.40, 2.45, 2.50, 2.55, 2.60, 2.65, 2.70 $g/cm^2$. The water absorption of the polymers of the invention can be determined in a known manner by any of the methods well known in the art. For example, the water absorption can be determined using by tests in the art for determining the water absorption coefficient of construction materials, such as DIN 52617.

In yet another example, in some embodiments the choice of monomers and/or the proportion by weight of the comonomers is such that the polymer of the invention has 14 day dry adhesion strength of greater than 1.8 $N/mm^2$ to about 2.0 $N/mm^2$ In some embodiments, the choice of monomers and/or the proportion by weight of the comonomers is such that the polymer of the invention has 14 day dry adhesion strength of greater than 1.8 $N/mm^2$ to about 2.06 $N/mm^2$ It should be understood that the lower or upper end points could be any of 1.80, 1.85, 1.90, 1.95, 2.00, 2.06 $N/mm^2$.

Adhesion strength can be determined in a known manner by any of the methods well known in the art. For example, adhesion strength can be determined by any of the adhesion tests used in the art for determination of tensile adhesion strength for cementitious adhesives, such as JG/T 24-2001.

In another example, in some embodiments the choice of monomers and/or the proportion by weight of the comonomers is such that the polymer of the invention has a 14 day dry curing adhesion strength in the range of 1.65 $N/mm^2$ to 2.06 $N/mm^2$ and a 14 day water absorption in the range of 1.85 $g/cm^2$ to 3.76 $g/cm^2$. For the 14 day dry curing adhesion strength it should be understood that the lower or upper end points could be any of 1.65, 1.70, 1.75, 1.80, 1.85, 1.90, 1.95, 2.00, 2.06 $N/mm^2$ For the 14 day water absorption it should be understood that the lower or upper end points could be any of 1.85, 1.90, 1.95, 2.00, 2.05, 2.10, 2.15, 2.20, 2.25, 2.30, 2.35, 2.40, 2.45, 2.50, 2.55, 2.60, 2.65, 2.70, 2.75, 2.80, 2.85, 2.90, 2.95, 3.00, 3.05, 3.10, 3.15, 3.20, 3.25, 3.30, 3.35, 3.40, 3.45, 3.50, 3.55, 3.60, 3.65, 3.70, 3.76 $g/cm^2$.

Additional Auxiliary Monomers

If desired, one or more additional auxiliary monomers can be present in the polymer of the invention and/or monomer compositions of the invention. In some embodiments, at least one additional auxiliary monomer can be present in the polymer of the invention and/or monomer compositions of the invention In some embodiments, the polymer optionally further comprises at least one auxiliary monomer. In some embodiments, the monomer composition optionally further comprises at least one auxiliary monomer.

When present, the amount of the auxiliary monomers can range from about 0.05 to about 50% by weight based on the total weight of the polymer. In some embodiments, the amount of the auxiliary monomers can range from about 1 to about 10% by weight based on the total weight of the polymer.

When present, the amount of the auxiliary monomers can range from about 0.05 to about 50% by weight based on the total weight of the monomer composition. In some embodiments, the amount of the auxiliary monomers can range from about 1 to about 10% by weight based on the total weight of the monomer composition.

Examples of auxiliary monomers, include, but are not limited to, ethylenically unsaturated monocarboxylic and dicarboxylic acids, e.g. acrylic acid, methacrylic acid, fumaric acid and maleic acid; ethylenically unsaturated carboxamides and nitriles, e.g. acrylamide and acrylonitrile; monoesters and diesters of fumaric acid and maleic acid, e.g. the diethyl and diisopropyl esters, and also maleic anhydride, ethylenically unsaturated sulfonic acids or salts thereof, e.g. vinylsulfonic acid, 2-acrylamido-2-methylpropanesulfonic acid. Further examples are precrosslinking comonomers such as multiply ethylenically unsaturated comonomers, for example divinyl adipate, diallyl maleate, allyl methacrylate or triallyl cyanurate, or postcrosslinking comonomers, for example acrylamidoglycolic acid (AGA), methyl methylacrylamidoglycolate (MAGME), N-methylolacrylamide (NMA), N-methylolmethacrylamide (NMMA), allyl N-methylolcarbamate, alkyl ethers such as the isobutoxy ether or ester of N-methylolacrylamide, of N-methylolmethacrylamide and of allyl N-methylolcarbamate. Epoxy-functional comonomers such as glycidyl methacrylate and glycidyl acrylate are also suitable. Further examples are silicon-functional comonomers such as acryloyloxypropyltri(alkoxy)-silanes and methacryloyloxypropyltri(alkoxy)silanes, vinyltrialkoxysilanes and vinylmethyldialkoxysilanes, with alkoxy groups which may be present being, for example, methoxy, ethoxy and ethoxypropylene glycol ether radicals. Mention may also be made of monomers bearing hydroxy or CO groups, for example hydroxyalkyl esters of methacrylic acid and acrylic acid, e.g., hydroxyethyl, hydroxypropyl or hydroxybutyl acrylate or methacrylate and also compounds such as diacetoneacrylamide and acetylacetoxyethyl acrylate or methacrylate.

In various embodiments, the invention provides a method for making a polymer, comprising: contacting a monomer composition with a catalyst composition under conditions effective to form the polymer, wherein the monomer composition comprises at least one vinyl ester, and at least one acrylic ester of a branched alcohol, wherein the branched alcohol is a branched $C_{16}$-$C_{32}$ alcohol; and the catalyst composition comprises at least one initiator. In some embodiments, the branched alcohol is a branched $C_{16}$-$C_{20}$ alcohol. In some embodiments, the monomer composition optionally further comprises at least one alkene. In some embodiments, the monomer composition optionally further comprises at least one acrylic ester of a $C_5$-$C_{13}$ alcohol. In some embodiments, the at least one initiator is at least one free-radical initiator. In some embodiments, the at least one free-radical initiator is at least one peroxide compound. In some embodiments, the initiator is a free-radical initiator. In some embodiments, the initiator is at least one peroxide compound. In some embodiments, the initiator is a polymerization initiator.

In various embodiments, the invention provides an aqueous polymer emulsion, comprising: a polymer and water, wherein the polymer comprises at least one vinyl ester; and at least one acrylic ester of a branched alcohol, wherein the branched alcohol is a $C_{16}$-$C_{32}$ alcohol. In some embodiments, the branched alcohol is a $C_{16}$-$C_{20}$ alcohol. In some embodiments, the acrylic ester of the branched $C_{16}$-$C_{32}$ alcohol is selected from 2-propenoic acid 2-hexyldodecyl ester, 2-propenoic acid 2-octyldodecyl ester, 2-propenoic acid 2-octyldecyl ester, 2-propenoic acid 2-hexyldecyl ester, and any combinations or mixtures thereof. In some embodiments, the at least one vinyl ester is vinyl acetate. In some embodiments, the branched $C_{16}$-$C_{32}$ alcohol is selected from 2-hexyl-1-decanol, 2-octyl-1-decanol, 2-hexyl-1-dodecanol, 2-octyl-1-dodecanol, and any combinations or mixtures thereof. In some embodiments, the at least one alkene is ethylene, and the at least one acrylic ester of a $C_5$-$C_{13}$ alcohol is lauryl acrylate. In some embodiments the polymer is a copolymer. In some embodiments, the acrylic ester of the branched $C_{16}$-$C_{32}$ alcohol is an acrylate ester. In some embodiments, the acrylic ester of the branched $C_{16}$-$C_{32}$ alcohol is a methacrylate ester. In some embodiments, the acrylic ester of the branched $C_{16}$-$C_{20}$ alcohol is an acrylate ester. In some embodiments, the acrylic ester of the branched $C_{16}$-$C_{20}$ alcohol is a methacrylate ester. In some embodiments, the acrylic ester of the branched $C_{16}$-$C_{32}$ alcohol is a mixture comprising: (i) from about 23 to about 27 by weight percent of 2-propenoic acid 2-hexyldodecyl ester; (ii) from about 27 to about 33 by weight percent of 2-propenoic acid 2-octyldodecyl ester; (iii) from about 23 to about 27 by weight percent of 2-propenoic acid 2-octyldecyl ester; and (iv) from about 15 to about 20 by weight percent of 2-propenoic acid 2-hexyldecyl ester. In some embodiments, the aqueous polymer emulsion further comprises one or more additives. In some embodiments, the aqueous polymer emulsion further comprises at least one additive.

In various embodiments, the invention provides, an emulsion polymerization process for producing an aqueous polymer emulsion, comprising contacting a monomer composition with water in the presence of a catalyst composition under conditions effective to polymerize the monomer composition to form the aqueous polymer emulsion, wherein the monomer composition comprises at least one vinyl ester, and at least one acrylic ester of a branched alcohol, wherein the branched alcohol is a branched $C_{16}$-$C_{32}$ alcohol; and the catalyst composition comprises at least one initiator. In some embodiments, the branched alcohol is a branched $C_{16}$-$C_{20}$ alcohol. In some embodiments, the monomer composition optionally further comprises at least one alkene. In some embodiments, the monomer composition optionally further comprises at least one acrylic ester of a $C_5$-$C_{13}$ alcohol. In some embodiments, the at least one initiator is at least one free-radical initiator. In some embodiments, the at least one free-radical initiator is at least one peroxide compound. In some embodiments, the initiator is at least one peroxide compound. In some embodiments, the initiator is a polymerization initiator.

In various embodiments, the invention provides an aqueous polymer dispersion, comprising: a polymer and water, wherein the polymer comprises at least one vinyl ester; and at least one acrylic ester of a branched alcohol, wherein the branched alcohol is a $C_{16}$-$C_{32}$ alcohol. In some embodiments, the branched alcohol is a $C_{16}$-$C_{20}$ alcohol. In some embodiments, the acrylic ester of the branched $C_{16}$-$C_{32}$ alcohol is selected from 2-propenoic acid 2-hexyldodecyl ester, 2-propenoic acid 2-octyldodecyl ester, 2-propenoic acid 2-octyldecyl ester, 2-propenoic acid 2-hexyldecyl ester, and any combinations or mixtures thereof. In some embodiments, the at least one vinyl ester is vinyl acetate. In some embodiments, the branched $C_{16}$-$C_{32}$ alcohol is selected from 2-hexyl-1-decanol, 2-octyl-1-decanol, 2-hexyl-1-dodecanol, 2-octyl-1-dodecanol, and any combinations or mixtures thereof. In some embodiments, the at least one alkene is ethylene, and the at least one acrylic ester of a $C_5$-$C_{13}$ alcohol is lauryl acrylate. In some embodiments the polymer is a copolymer. In some embodiments, the acrylic ester of the branched $C_{16}$-$C_{32}$ alcohol is an acrylate ester. In some embodiments, the acrylic ester of the branched $C_{16}$-$C_{32}$ alcohol is a methacrylate ester. In some embodiments, the acrylic ester of the branched $C_{16}$-$C_{20}$ alcohol is an acrylate ester. In some embodiments, the acrylic ester of the branched $C_{16}$-$C_{20}$ alcohol is a methacrylate ester. In some embodiments, the acrylic ester of the branched $C_{16}$-$C_{32}$ alcohol is a mixture comprising: (i) from about 23 to about 27 by weight percent of 2-propenoic acid 2-hexyldodecyl ester; (ii) from about 27 to about 33 by weight percent of 2-propenoic acid 2-octyldodecyl ester; (iii) from about 23 to about 27 by weight percent of 2-propenoic acid 2-octyldecyl ester; and (iv) from about 15 to about 20 by weight percent of 2-propenoic acid 2-hexyldecyl ester. In some embodiments, the aqueous polymer dispersion further comprises one or more additives. In some embodiments, the aqueous polymer dispersion further comprises at least one additive.

In various embodiments, the invention provides a process for making an aqueous polymer dispersion, comprising contacting a polymer with water, wherein the polymer comprises at least one vinyl ester; and at least one acrylic ester of a branched alcohol, wherein the branched alcohol is a $C_{16}$-$C_{32}$ alcohol. In some embodiments, the branched alcohol is a $C_{16}$-$C_{20}$ alcohol. In some embodiments, the polymer is a powder.

Without limitations, the polymers of the invention can be prepared using the emulsion polymerization process or by the suspension polymerization process. Further, the polymerization can be in the presence or absence of protective colloids and/or of emulsifiers. In some embodiments, the polymerization is in the presence of protective colloids and/or of emulsifiers.

Exemplary protective colloids include, but are not limited to, partially hydrolyzed polyvinyl alcohols; polyvinylpyrrolidones; polyvinyl acetals; polysaccharides in water-soluble form, e.g., starches (amylose and amylopectin), celluloses and their carboxymethyl, methyl, hydroxyethyl, hydroxypropyl derivatives; proteins, such as caseine or caseinate, soya protein, gelatin; ligninsulfonates; synthetic polymers, such as poly(meth)acrylic acid, copolymers of (meth)acrylates having carboxy-functional comonomer units, poly(meth)acrylamide, polyvinylsulfonic acids and their water-soluble copolymers; melamine-formaldehydesulfonates, naphthalene-formaldehydesulfonates, styrene-maleic acid copolymers, vinyl ether-maleic acid copolymers.

In some embodiments, the protective colloids include partially hydrolyzed or completely hydrolyzed polyvinyl alcohols having a degree of hydrolysis of from 80 to 100 mol %. In some embodiments, the protective colloids include partially hydrolyzed polyvinyl alcohols having a degree of hydrolysis of 88 mol % and viscosity of 5 cps.

Generally, the total amount of the protective colloids used, based on the total weight of the monomers, in the polymerization is from 1 to 20% by weight. In some embodiments, the total amount of the protective colloids used, based on the total weight of the monomers, in the polymerization is from 2.5 to 7.5% by weight. It is possible for all of the protective colloid content to form an initial charge, or else to be divided between initial charge and feed.

As noted above, the polymerization can be carried out in the presence or absence of emulsifiers. Suitable emulsifiers are either anionic, cationic, or else non-ionic emulsifiers, e.g. anionic surfactants, such as alkyl sulfates having a chain length of from 8 to 18 carbon atoms, alkyl or alkylaryl ether sulfates having from 8 to 18 carbon atoms in the hydrophobic radical and up to 40 ethylene oxide or propylene oxide units, alkyl- or alkylarylsulfonates having from 8 to 18 carbon atoms, esters and half-esters of sulfosuccinic acid with monohydric alcohols or with alkylphenols, and non-ionic surfactants, such as alkyl polyglycol ethers or alkylaryl polyglycol ethers having from 8 to 40 ethylene oxide units. When used, the emulsifier can be used in an amount ranging from about 0.1 to about 5% by weight, based on the amount of monomers.

In various embodiments the polymerization is an emulsion polymerization process. The polymerization temperature generally being from about 40° C. to about 100° C. In some embodiments, the polymerization temperature ranges from about 60° C. to about 90° C. When gaseous comonomers are to be copolymerized, e.g., ethylene, 1,3-butadiene or vinyl chloride, the polymerization can also be carried out at superatmospheric pressure, e.g., from about 5 to about 100 bar.

Generally, the polymerization is initiated using the water-soluble or monomer-soluble initiators commonly used for emulsion or suspension polymerization, or redox-initiator combinations. Examples of water-soluble initiators are the sodium, potassium, and ammonium salts of peroxydisulfuric acid, hydrogen peroxide, tert-butyl peroxide, tert-butyl hydroperoxide, potassium peroxydiphosphate, tert-butyl peroxypivalate, cumene hydroperoxide, isopropylbenzene monohydroperoxide, and azobisisobutyronitrile. Examples of monomer-soluble initiators are dicetyl peroxydicarbonate, dicyclohexyl peroxydicarbonate, and dibenzoyl peroxide. The amount of the initiators generally used, based on the total weight of the monomers, is from about 0.001 to about 0.5% by weight. In some embodiments, the amount of the initiators used, based on the total weight of the monomers, is from about 0.001 to about 0.02% by weight. In some embodiments, the amount of the initiators used, based on the total weight of the monomers, is from about 0.001 to about 0.1% by weight. In some embodiments, the amount of the initiators used, based on the total weight of the monomers, is from about 0.01 to about 0.5% by weight.

Redox initiators can be used with reducing agents. Exemplary reducing agents include, but are not limited to, the sulfites and bisulfites of the alkali metals and of ammonium, e.g., sodium sulfite, the derivatives of sulfoxylic acid, e.g., the formaldehydesulfoxylate of zinc or of an alkali metal, e.g., sodium hydroxymethanesulfinate, and ascorbic acid. The amount of reducing agent used, based on the total weight of the monomers, can range from about 0.001 to about 0.5% by weight.

In some embodiments, the amount of the reducing agent used, based on the total weight of the monomers, is from about 0.001 to about 0.03% by weight. In some embodiments, the amount of the reducing agent used, based on the total weight of the monomers, is from about 0.001 to about 0.015% by weight. In some embodiments, the amount of reducing agent used, based on the total weight of the monomers, is from about 0.01 to about 0.5% by weight, based on the total weight of the monomers.

Without wishing to be bound by a theory, the molecular weight of the copolymer can be controlled during the polymerization process by use of chain transfer agents. When used, the chain transfer agents can be used in an amount ranging from about 0.01 to 5.0% by weight, based on the monomers to polymerized. Without limitations, the chain transfer agents can be used either as a separate feed or pre-mixed with reaction components. Exemplary chain transfer agents include, but are not limited to, n-dodecyl mercaptan, tert-dodecyl mercaptan, mercaptopropionic acid, methyl mercaptopropionate, isopropanol, and acetaldehyde.

In some embodiments, no chain transfer agents are used.

Regardless of the polymerization process employed, all of the monomers can be present in the initial charge, all can be supplied as a feed, or some of the monomers can be present in the initial charge, the remainder fed in after initiation of the polymerization. In some embodiments, the procedure is that from 50 to 100% by weight of the monomers, based on their total weight, from the initial charge, the remainder supplied as a feed. The feeds can be separate (in space and time) or some or all of the components can be fed in pre-emulsified form.

Once the polymerization has been concluded, post-polymerization can be carried out using known methods to remove residual monomers, for example using redox-catalyst-initiated post-polymerization. Volatile residual monomers can also be removed by means of distillation. Such distillation can be at subatmospheric pressure, optionally with passage of inert entrainer gases, such as air, nitrogen, or steam, through or over the product. In some embodiments, the aqueous polymer emulsions can have a solids content from about 30 to about 75% by weight. In some embodiments, the aqueous polymer emulsions can have a solids content from 50 to 60% by weight.

In addition to the polymer, the aqueous polymer emulsions can include protective colloids and/or emulsifiers, i.e., those used in the polymerization. Without wishing to be bound by a theory, these protective colloids and/or emulsifiers can help in stabilizing the dispersion. As discussed above, in some embodiments, protective colloids include partially hydrolyzed or completely hydrolyzed polyvinyl alcohols having a degree of hydrolysis of from 80 to 100 mol %. In some embodiments, the dispersion comprises protective colloids the amount of, from about 1 to about 20% by weight, based on the total weight of the monomers used.

To prepare the polymer powders, the aqueous polymer emulsions, optionally after addition of protective colloids as spraying aids, are dried. Without limitation, the drying can include fluidized-bed drying, freeze drying, or spray drying. In some embodiments, the polymer emulsions are spray-dried. Spray drying takes place in conventional spray-drying systems, and atomization can be by means of single-, twin-, or multi-fluid nozzles, or can use a rotation disk, etc. Generally, the discharge temperature can range from about 45° C. to about 120° C., depending on the system, the Tg of the resin, and the desired degree of drying. In some embodiments, the discharge temperature can range from about 60° C. to about 90° C., depending on the system, the Tg of the resin, and the desired degree of drying. The particles produced can be further dried, for example by air flow, including heated air.

In some embodiments, when water-redispersible polymer powders are desired, a spraying aid, such as protective colloids, in an amount from about 3 to about 30% by weight, based on the polymeric constituents of the dispersion, can be used. Generally, this means that the total amount of spraying aid prior to the drying procedure is to be at least from about 1 to about 30% by weight, based on polymer content. In some embodiments, the spraying aid is used in an amount from about 3 to about 20% by weight, based on polymer content. In some embodiments, the spraying aid is used in an amount from about 5 to about 15% by weight, based on polymer content.

Exemplary spraying aids include, but are not limited to, partially or full hydrolyzed polyvinyl alcohols; polyvinylpyrrolidones; polysaccharides in water-soluble form, such as starches (amylose and amylopectin), celluloses and their carboxymethyl, methyl, hydroxyethyl, hydroxypropyl derivatives; proteins, such as caseine or caseinate, soya protein, gelatin; ligninsulfonates; synthetic polymers, such as poly(meth)acrylic acid, copolymers of (meth)acrylates having carboxy-functional comonomer units, poly(meth)acrylamide, polyvinylsulfonic acids and their water-soluble copolymers; melamine-formaldehydesulfonates, naphthalene-formaldehydesulfonates, styrene-maleic acid copolymers, and vinyl ether-maleic acid copolymers.

In some embodiments, no protective colloids other than polyvinyl alcohols are used as a spraying aid.

In some embodiments, the resultant powder can be provided with an antiblocking agent (anticaking agent). Without wishing to be bound by a theory, use of antiblocking agents can increase storage stability of the powdered polymer by improving blocking resistance, in particular in the case of powders with low glass transition temperature. Exemplary antiblocking agents include, but are not limited to, calcium carbonate, magnesium carbonate, talc, gypsum, silica, kaolins, and silicates with particle sizes in some embodiments in the range from 10 nm to 10 µm.

In some embodiments, the antiblocking agent are calcium carbonate and kaolin. In some embodiments, calcium carbonate and kaolin can be in the form of a particle with a particle size in a range of 10 to 100 µm. In some embodiments, calcium carbonate and kaolin can be in the form of a particle with a particle size in a range of 20 to 70 µm.

If used, the antiblocking agent can be present in amounts of up to 30% by weight, based on the total weight of polymeric constituents. For example, in some embodiments the antiblocking agent can be present in an amount in the range of from about 5 to 25% by weight, based on the total weight of polymeric constituents. In some embodiments, the antiblocking agent can be present in an amount in the range of from about 10 to 20% by weight, based on the total weight of polymeric constituents.

Other additives can also be added during spraying to improve performance characteristics. Examples of other constituents of emulsion powder compositions and/or dispersion powder compositions include pigments, fillers, and foam stabilizers. Examples of fillers which can be used are carbonates such as calcium carbonate in the form of dolomite, calcite, or chalk, silicates such as magnesium silicate in the form of talc, or aluminum silicates, such as loam and clays; powered quartz, quartz sand, finely divided silica, feldspar, barite, and calcium sulfate. Fibrous fillers are also suitable. Use is often made industrially of mixtures of various fillers, for example mixtures of fillers of different particle size, or mixtures of carbonaceous and silicaceous fillers.

Generally, the viscosity of the dispersion or emulsion for spraying is adjusted, by way of the solids content, to give a value of <500 mPas (Brookfield viscosity at 20 rpm and 23°

C.). In some embodiments, the viscosity of the dispersion or emulsion for spraying is adjusted, by way of the solids content, to give a value of <250 mPas (Brookfield viscosity at 20 rpm and 23° C.). In some embodiments, the solids content of the dispersion for spraying is >35%. In some embodiments, the solids content of the dispersion for spraying is >40%.

As discussed above, the polymers of the invention can be used alone or in combination with conventional polymer emulsions or emulsion powders or conventional polymer dispersions or dispersion powders in building chemical products, such as building adhesives, tile adhesives, thermal insulation adhesives, renders, filling compounds, floor filling compounds, leveling compounds, sealing slurries, jointing mortars and paints.

In various embodiments, the invention provides a mortar formulation, wherein the mortar formulation comprises a polymer of the invention. In some embodiments, the invention provides a mortar formulation, wherein the mortar formulation comprises a polymer, wherein the polymer comprises at least one vinyl ester; and at least one acrylic ester of a branched alcohol, wherein the branched alcohol is a $C_{16}$-$C_{32}$ alcohol. In some embodiments, the mortar formulation is selected from an adhesive formulation, a tile adhesive formulation, a render formulation, a building adhesive, a thermal insulation adhesive, a filling compound, a floor filling compound, a leveling compound, a sealing slurry, and a jointing mortar formulation. In some embodiments, the mortar formulation is a tile adhesive formulation. In some embodiments, the mortar formulation is a render formulation. In some embodiments, the mortar formulation is a cementitious mortar formulation. In some embodiments, the polymer is a powder. In some embodiments, the polymer is an emulsion.

In various embodiments, the invention provides a cementitious formulation, wherein the cementitious formulation comprises a polymer of the invention. In some embodiments, the invention provides a cementitious formulation, wherein the cementitious formulation comprises a polymer, wherein the polymer comprises at least one vinyl ester; and at least one acrylic ester of a branched alcohol, wherein the branched alcohol is a $C_{16}$-$C_{32}$ alcohol. In some embodiments, the cementitious formulation is a mortar formulation. In some embodiments, the cementitious formulation is selected from an adhesive formulation, a tile adhesive formulation, a render formulation, a building adhesive, a thermal insulation adhesive, a filling compound, a floor filling compound, a leveling compound, a sealing slurry, and a jointing mortar formulation. In some embodiments, the cementitious formulation is a tile adhesive formulation. In some embodiments, the cementitious formulation is a render formulation. In some embodiments, the polymer is a powder. In some embodiments, the polymer is an emulsion.

In various embodiments, the invention provides a cementitious product, wherein the cementitious product comprises a polymer of the invention. In some embodiments, the invention provides a cementitious product, wherein the cementitious product comprises a polymer, wherein the polymer comprises at least one vinyl ester; and at least one acrylic ester of a branched alcohol, wherein the branched alcohol is a $C_{16}$-$C_{32}$ alcohol. In some embodiments, the cementitious product is selected from an adhesive formulation, a tile adhesive formulation, a render formulation, a building adhesive, a thermal insulation adhesive, a filling compound, a floor filling compound, a leveling compound, a sealing slurry, and a jointing mortar formulation. In some embodiments, the cementitious product is a tile adhesive formulation. In some embodiments, the cementitious product is a render formulation. In some embodiments, the polymer is a powder. In some embodiments, the polymer is an emulsion.

In various embodiments, the invention provides an adhesive formulation, wherein the adhesive formulation comprises a polymer of the invention. In some embodiments, the invention provides an adhesive formulation, wherein the adhesive formulation comprises a polymer, wherein the polymer comprises at least one vinyl ester; and at least one acrylic ester of a branched alcohol, wherein the branched alcohol is a $C_{16}$-$C_{32}$ alcohol. In some embodiments, the adhesive formulation is selected from a tile adhesive formulation, a building adhesive, and a thermal insulation adhesive. In some embodiments, the adhesive formulation is a cementitious adhesive formulation. In some embodiments, the adhesive formulation is a tile adhesive formulation. In some embodiments, the polymer is a powder. In some embodiments, the polymer is an emulsion.

In some embodiments, the polymer in the formulation can be in form of a powder or a polymeric powder, e.g., water re-dispersible powder. Further, the formulation can be in a liquid or dry form. In some embodiments, the formulation can be in the form of an emulsion. In some embodiments, the formulation can be in the form of a dispersion.

Amount of the polymer, e.g., polymer powder, water re-dispersible polymer powder in the formulation can range from about 0.5 to 20% by weight, based on the total weight of the formulation. In some embodiments, amount the polymer, e.g., water re-dispersible polymer powder in the formulation ranges from about 0.1 to 10% by weight, based on the total weight of the formulation. In some embodiments, the amount is about 3%, based on the total weight of the formulation.

In some embodiments, the formulation (e.g., mortar formulation, cementitious formulation, adhesive formulation) can also include one or more other components known in the art for use with such formulations. For example the formulation (e.g., mortar formulation, cementitious formulation, adhesive formulation) can further comprise hydraulically setting binders such as cements, including but not limited to Portland cement, alumina cement, pozzolanic cement, slag cement, magnesia cement, phosphate cement; plaster of Paris; fillers, such as calcium carbonate, silicates, aluminum silicates; powered quartz; quartz sand; finely divided silica; feldspar; barite; calcium sulfate; water retention agents; water and any combinations thereof.

Cement, such as Portland cement, alumina cement, pozzolanic cement, slag cement, magnesia cement and/or phosphate cement can be included in the formulation (e.g., mortar formulation, cementitious formulation, adhesive formulation) in an amount from about 20 to about 45% by weight, based on the total weight of the formulation. In some embodiments, the cement is included in the formulation (e.g., mortar formulation, cementitious formulation, adhesive formulation) in an amount from about 20 to about 40% by weight, based on the total weight of the formulation.

In some embodiments, the formulation (e.g., mortar formulation, cementitious formulation, adhesive formulation) further comprises quartz sand. When present, the quartz sand can be in an amount from about 35 to about 65% by weight, based on the total weight of the formulation. In some embodiments, when present, quartz sand is an amount from about 37.5 to about 62.5% by weight, based on the total weight of the formulation. Further, in some embodiments, quartz sand is in particulate form with a particle size≤0.5 mm.

As used herein, the term "water retention agent" refers to an agent that keeps the water content of the formulation (e.g., mortar formulation, cementitious formulation, adhesive formulation) within appropriate limits, without depleting or enriching the water content. The art discloses uses of cellulose ethers as water retention agents. Thus, a water retention agent can be selected from the group consisting of alkylhydroxyalkyl celluloses, hydroxyalkyl celluloses, and mixtures thereof.

Examples of cellulose ethers for use as water retention agents include, but are not limited to, methylcellulose (MC), methylhydroxyethylcellulose (MHEC), methylhydroxypropylcellulose (MHPC), hydroxyethylcellulose (HEC), ethylhydroxyethylcellulose (EHEC), methylethylhydroxyethylcellulose (MEHEC), hydrophobically modified ethylhydroxyethylcelluloses (HMEHEC), hydrophobically modified hydroxyethylcelluloses (HMHEC), sulfoethyl methylhydroxyethylcelluloses (SEMHEC), sulfoethyl methylhydroxypropylcellulses (SEMHPC), sulfoethyl hydroxyethylcelluloses (SEHEC), and mixtures thereof. Additional exemplary water retention agents are described, for example in U.S. Pat. Nos. 8,685,158, 4,501,617, DE 3909070, DE3913518, CA2456793, and EP 773198. In some embodiments, the water retention agent is Tylose® Hi90SH-3000.

The water retention agent can be included in the formulation (e.g., mortar formulation, cementitious formulation, adhesive formulation) in an amount in a range of from about 0.05 to 0.5% by weight, based on the total weight of the formulation.

For some applications, the formulation (e.g., mortar formulation, cementitious formulation, adhesive formulation) can further comprise calcium carbonate in an amount from about 10 to 30% by weight, based on the total weight of the formulation. In some embodiments, the amount of calcium carbonate, if present, in the formulation (e.g., mortar formulation, cementitious formulation, adhesive formulation) ranges from about 15 to 25% by weight, based on the total weight of the formulation.

Articles of Manufacture

In various embodiments, the invention provides an article of manufacture comprising a polymer of the invention. In some embodiments, the invention provides an article of manufacture comprising a polymer, wherein the polymer comprises at least one vinyl ester; and at least one acrylic ester of a branched alcohol, wherein the branched alcohol is a branched $C_{16}$-$C_{32}$ alcohol. In some embodiments, the invention provides an article of manufacture comprising a polymer, wherein the polymer comprises at least one vinyl ester; and at least one acrylic ester of a branched alcohol, wherein the branched alcohol is a branched $C_{16}$-$C_{20}$ alcohol. In some embodiments, the polymer further comprises optionally, at least one alkene; and optionally, at least one acrylic ester of a $C_5$-$C_{13}$ alcohol. In some embodiments, the polymer is a powder. In some embodiments, the polymer is an emulsion. In some embodiments, the article of manufacture is selected from a building adhesive, tile adhesive, thermal insulation adhesive, render material, render formulation, render composition, skim coat, knifing filler, flooring screed, self-leveling composition, floor filling compound, filling compound, leveling compound, sealing slurry, mortar formulation, mortar material, mortar composition, cementitious product, cementitious formulation, jointing mortar, paint, coating formulation, and varnish formulation. In some embodiments, the article of manufacture is a mortar formulation. In some embodiments, the article of manufacture is a tile adhesive. In some embodiments, the article of manufacture is a render formulation. In some embodiments, the article of manufacture is a cementitious product. In some embodiments, the article of manufacture is a cementitious formulation. In some embodiments, the article of manufacture is a hydrophobicizing agent.

In various embodiments, the invention provides a composition comprising a polymer of the invention. In some embodiments, the invention provides a composition comprising a polymer, wherein the polymer comprises at least one vinyl ester; and at least one acrylic ester of a branched alcohol, wherein the branched alcohol is a branched $C_{16}$-$C_{32}$ alcohol. In some embodiments, the invention provides a composition comprising a polymer, wherein the polymer comprises at least one vinyl ester; and at least one acrylic ester of a branched alcohol, wherein the branched alcohol is a branched $C_{16}$-$C_{20}$ alcohol. In some embodiments, the polymer further comprises optionally, at least one alkene; and optionally, at least one acrylic ester of a $C_5$-$C_{13}$ alcohol.

In some embodiments, the polymer is a powder. In some embodiments, the polymer is an emulsion.

In some embodiments, the polymer in the composition can be in form of a powder or a polymeric powder, e.g., water re-dispersible powder. Further, the composition can be in a liquid or dry form. In some embodiments, the composition can be in the form of an emulsion. In some embodiments, the composition can be in the form of a dispersion.

Amount of the polymer, e.g., polymer powder, water re-dispersible polymer powder in the composition can range from about 0.5 to 20% by weight, based on the total weight of the composition. In some embodiments, amount the polymer, e.g., water re-dispersible polymer powder in the composition ranges from about 0.1 to 10% by weight, based on the total weight of the composition. In some embodiments, the amount is about 3%, based on the total weight of the composition.

In some embodiments, the composition (e.g., mortar composition, cementitious composition, adhesive composition) can also include one or more other components known in the art for use with such composition. For example the composition (e.g., mortar composition, cementitious composition, adhesive composition) can further comprise hydraulically setting binders such as cements, including but not limited to Portland cement, alumina cement, pozzolanic cement, slag cement, magnesia cement, phosphate cement; plaster of Paris; fillers, such as calcium carbonate, silicates, aluminum silicates; powered quartz; quartz sand; finely divided silica; feldspar; barite; calcium sulfate; water retention agents; water and any combinations thereof.

Cement, such as Portland cement, alumina cement, pozzolanic cement, slag cement, magnesia cement and/or phosphate cement can be included in the composition (e.g., mortar composition, cementitious composition, adhesive composition) in an amount from about 20 to about 45% by weight, based on the total weight of the composition. In some embodiments, the cement is included in the composition (e.g., mortar composition, cementitious composition, adhesive composition) in an amount from about 20 to about 40% by weight, based on the total weight of the composition.

In some embodiments, the composition (e.g., mortar composition, cementitious composition, adhesive composition) further comprises quartz sand. When present, the quartz sand can be in an amount from about 35 to about 65% by weight, based on the total weight of the composition. In some embodiments, when present, quartz sand is an amount from about 37.5 to about 62.5% by weight, based on the total weight of the composition. Further, in some embodiments, quartz sand is in particulate form with a particle size≤0.5 mm.

As used herein, the term "water retention agent" refers to an agent that keeps the water content of the composition (e.g., mortar composition, cementitious composition, adhesive composition) within appropriate limits, without depleting or enriching the water content. The art discloses uses of cellulose ethers as water retention agents. Thus, a water retention agent can be selected from the group consisting of alkylhydroxyalkyl celluloses, hydroxyalkyl celluloses, and mixtures thereof.

Examples of cellulose ethers for use as water retention agents include, but are not limited to, methylcellulose (MC), methylhydroxyethylcellulose (MHEC), methylhydroxypropylcellulose (MHPC), hydroxyethylcellulose (HEC), ethylhydroxyethylcellulose (EHEC), methylethylhydroxyethylcellulose (MEHEC), hydrophobically modified ethylhydroxyethylcelluloses (HMEHEC), hydrophobically modified hydroxyethylcelluloses (HMHEC), sulfoethyl methylhydroxyethylcelluloses (SEMHEC), sulfoethyl methylhydroxypropylcellulses (SEMHPC), sulfoethyl hydroxyethylcelluloses (SEHEC), and mixtures thereof. Additional exemplary water retention agents are described, for example in U.S. Pat. Nos. 8,685,158, 4,501,617, DE 3909070, DE3913518, CA2456793, and EP 773198. In some embodiments, the water retention agent is Tylose® Hi90SH-3000.

The water retention agent can be included in the composition (e.g., mortar composition, cementitious composition, adhesive composition) in an amount in a range of from about 0.05 to 0.5% by weight, based on the total weight of the composition.

For some applications, the composition (e.g., mortar composition, cementitious composition, adhesive composition) can further comprise calcium carbonate in an amount from about 10 to 30% by weight, based on the total weight of the composition. In some embodiments, the amount of calcium carbonate, if present, in the composition (e.g., mortar composition, cementitious composition, adhesive composition) ranges from about 15 to 25% by weight, based on the total weight of the composition.

In some embodiments, the composition is selected from a cementitious composition, mortar composition, render composition, adhesive composition, paint composition, skim coat composition, knifing filler composition, floor screed composition, floor filling composition, filling composition, leveling composition, sealing composition, coating composition, varnish composition, jointing mortar composition, tile adhesive composition, building adhesive composition, and thermal insulation composition.

In some embodiments, the composition is a mortar composition. In some embodiments, the composition is a tile adhesive composition. In some embodiments, the composition is a render composition. In some embodiments, the composition is a cementitious composition. In some embodiments, the composition is a hydrophobicizing agent composition.

Some embodiments of the present invention can be defined as any of the following numbered paragraphs:
1. A polymer, comprising: at least one vinyl ester; and at least one acrylic ester of a branched alcohol, wherein the branched alcohol is a branched $C_{16}$-$C_{32}$ alcohol.
2. The polymer of paragraph 1, wherein the branched alcohol is a branched $C_{16}$-$C_{20}$ alcohol.
3. The polymer of paragraph 1, wherein the acrylic ester of the branched $C_{16}$-$C_{32}$ alcohol is selected from 2-propenoic acid 2-hexyldodecyl ester, 2-propenoic acid 2-octyldodecyl ester, 2-propenoic acid 2-octyldecyl ester, 2-propenoic acid 2-hexyldecyl ester, and any combinations or mixtures thereof.
4. The polymer of paragraph 1, wherein the polymer further comprises optionally, at least one alkene; and optionally, at least one acrylic ester of a $C_5$-$C_{13}$ alcohol.
5. The polymer of paragraph 1, wherein the at least one vinyl ester is vinyl acetate.
6. The polymer of paragraph 1, wherein the branched $C_{16}$-$C_{32}$ alcohol is selected from 2-hexyl-1-decanol, 2-octyl-1-decanol, 2-hexyl-1-dodecanol, 2-octyl-1-dodecanol, and any combinations or mixtures thereof.
7. The polymer of paragraph 4, wherein the at least one alkene is ethylene, and the at least one acrylic ester of a $C_5$-$C_{13}$ alcohol is lauryl acrylate.
8. The polymer of paragraph 1, wherein the polymer is a copolymer.
9. The polymer of paragraph 1, wherein the at least one acrylic ester of a branched $C_{16}$-$C_{32}$ alcohol is an acrylate ester or a methacrylate ester.
10. The polymer of paragraph 1, wherein the at least one acrylic ester of the branched $C_{16}$-$C_{32}$ alcohol is a mixture comprising: (i) from about 23 to about 27 by weight percent of 2-propenoic acid 2-hexyldodecyl ester; (ii) from about 27 to about 33 by weight percent of 2-propenoic acid 2-octyldodecyl ester; (iii) from about 23 to about 27 by weight percent of 2-propenoic acid 2-octyldecyl ester; and (iv) from about 15 to about 20 by weight percent of 2-propenoic acid 2-hexyldecyl ester.
11. The polymer of paragraph 1, wherein the polymer is in the form of an emulsion or a powder.
12. The polymer of paragraph 1, having a Tg onset temperature of from about 10° C. to about 55° C.
13. The polymer of paragraph 1, wherein the polymer comprises 60 to 97 percent by weight of the at least one vinyl ester; and 0.5 to 20 percent by weight of the at least one acrylic ester of the branched $C_{16}$-$C_{32}$ alcohol.
14. A composition comprising the polymer of paragraph 1.
15. The composition of paragraph 14, wherein the composition is a cementitious composition.
16. An article of manufacture comprising the polymer of paragraph 1.
17. A formulation comprising the polymer of paragraph 1.
18. The formulation of paragraph 17, which is a mortar formulation.
19. The formulation of paragraph 18, wherein the mortar formulation is selected from a tile adhesive formulation and a render formulation.
20. The formulation of paragraph 18, wherein the mortar formulation is a render formulation.
21. The formulation of paragraph 20, wherein the render formulation has a 14 day dry curing adhesion strength of greater than 1.8 N/mm$^2$ to about 2.0 N/mm$^2$ 22. The formulation of paragraph 20, wherein the render formulation has a 14 day water absorption in the range of about 1.8 g/cm$^2$ to less than 2.7 g/cm$^2$.
23. The formulation of paragraph 20, wherein the render formulation has a 14 day dry curing adhesion strength in the range of 1.65 N/mm$^2$ to 2.06 N/mm$^2$ and a 14 day water absorption in the range of 1.85 g/cm$^2$ to 3.76 g/cm$^2$.

The disclosure is further illustrated by the following examples which should not be construed as limiting. The examples are illustrative only, and are not intended to limit, in any manner, any of the aspects described herein. The following examples do not in any way limit the invention.

EXAMPLES

The following examples are not intended to limit the scope of the claims to the invention, but are rather intended to be exemplary of certain embodiments. Any variations in the exemplified methods which occur to the skilled artisan are intended to fall within the scope of the invention.

The invention will be further explained by the following examples, which are intended to be purely exemplary of the invention, and should not be considered as limiting the invention in any way. The following examples are provided to better illustrate the claimed invention and are not to be interpreted as limiting the scope of the invention. To the extent that specific materials are mentioned, it is merely for purposes of illustration and is not intended to limit the invention. One skilled in the art may develop equivalent means or reactants without the exercise of inventive capacity and without departing from the scope of the invention.

General Procedure for the Preparation of Polymer Emulsions

The Initial Charge (463.5 grams) was added to a three liter reaction vessel at room temperature with agitation of 250 rpm and heated to 60° C. The three liter reaction vessel was equipped with a reflux condenser, addition funnels, and stirrer. The reaction vessel containing the Initial Charge was heated to 68° C. and kept at a pressure of 10 kg/cm². At this stage, a Monomer Composition (550 grams) was metered into the reaction vessel over a period of four hours at a temperature of 68° C. and at a constant pressure of 10 kg/cm² (when ethylene is present in the Monomer Composition the ethylene is added at a constant pressure of 10 kg/cm² with the other components of the Monomer Composition). A Catalyst Solution was slowly added to the reaction vessel over a period of four hours simultaneous with the Monomer Composition. Then 0.5 grams of tertiary butyl hydroperoxide in 6 grams water and 0.4 grams sodium hydrogen sulfite were added to the reaction vessel. The pH of the polymer emulsion was adjusted to 5.0 by the addition of 26.6% aqueous ammonium hydroxide solution. After the four hour period the reaction vessel was placed under vacuum for 3 hours at 80° C. and dried to provide the resulting polymer. The glass transition temperature (Tg) of the resulting polymer was further determined by DSC (Perkin Elmer Diamond, United State) according to ASTM D3418.

The Initial Charge was a protective colloid solution of polyvinyl alcohol:water=5.5:94.5 by weight percent.

The Catalyst Solution was an aqueous solution of ammonium persulfate (APS), $(NH_4)_2S_2O_8$. During the polymerization process 3.35 grams of a first aqueous catalyst solution containing 19.3 wt % APS was initially added to the reaction vessel to initiate the polymerization of the Monomer Composition. Once the polymerization of the Monomer Composition was initiated, 41 grams of a second aqueous catalyst solution containing 2.5 wt % APS was added to the reaction vessel over the four hour period simultaneous with the Monomer Composition.

Example 1. Polymer Emulsions

Emulsion polymerization as described in the General Procedure for the Preparation of Polymer Emulsions provided herein was used to prepare exemplary polymer emulsions using the Monomer Compositions (MC1-MC9) as shown in Table 1. The glass transition temperature (Tg) of the resulting polymer was further determined by Differential Scanning calorimetry (DSC) according to ASTM D3418.

TABLE 1

| Monomer Compositions (MC1-MC9) | | | | | |
|---|---|---|---|---|---|
| Monomer (wt %) | MC1 | MC2 | MC3 | MC4 | MC5 |
| Vinyl acetate | 97 | 97 | 87 | 87 | 85 |
| Ethylene | 0 | 0 | 10 | 10 | 10 |
| Acrylic Ester Mixture | 3 | 1.5 | 3 | 1.5 | 5 |
| Lauryl acrylate | 0 | 1.5 | 0 | 1.5 | 0 |
| Tg of Resulting Polymer | 47.1° C. | 38.7° C. | 25° C. | 30° C. | 33° C. |

| Monomer (wt %) | MC6 | MC7 | MC8 | MC9 |
|---|---|---|---|---|
| Vinyl acetate | 85 | 97 | 100 | 90 |
| Ethylene | 10 | 0 | 0 | 10 |
| Acrylic Ester Mixture | 2.5 | 0 | 0 | 0 |
| Lauryl acrylate | 2.5 | 3 | 0 | 0 |
| Tg of Resulting Polymer | 31° C. | 38.5° C. | 32° C. | 15° C. |

The "Acrylic Ester Mixture" of Table 1 is a mixture of acrylate esters of branched $C_{16}$-$C_{20}$ alcohols comprising (i) about 23 to about 27 by weight percent of 2-propenoic acid 2-hexyldodecyl ester; (ii) about 27 to about 33 by weight percent of 2-propenoic acid 2-octyldodecyl ester; (iii) about 23 to about 27 by weight percent of 2-propenoic acid 2-octyldecyl ester; and (iv) about 15 to about 20 by weight percent of 2-propenoic acid 2-hexyldecyl ester. The "Acrylic Ester Mixture" of Table 1 was prepared by reacting Isofol® 18T with 2-propenoic acid under conditions suitable for esterification conditions known in the art. Isofol® 18T is a mixture of branched $C_{16}$-$C_{20}$ alcohols comprising (i) 23-27 weight percent of 2-hexyl-1-dodecanol; (ii) 27-33 weight percent of 2-octyl-1-dodecanol; (iii) 23-27 weight percent of 2-octyl-1-decanol; and (iv) 15-20 weight percent of 2-hexyl-1-decanol.

Monomer Compositions (MC1-MC6) of Table 1 are each an embodiment of a monomer composition of the invention. Monomer compositions (MC7, MC8, and MC9) are not monomer compositions of the invention and are provided for comparative purposes.

Example 2. Effect of Acrylic Ester Amount on Emulsion Stability

Monomer compositions (MC10-MC13) as shown in Table 2 comprising vinyl acetate and differing amounts of acrylate esters of branched $C_{16}$-$C_{20}$ alcohols were prepared for studying polymer emulsion stability. Emulsion polymerization as described in the General Procedure for the Preparation of Polymer Emulsions provided herein was used to prepare exemplary polymer emulsions using the Monomer Compositions (MC10-MC13) as shown in Table 2.

The polymer emulsions prepared from the monomer compositions (MC10-MC13) in Table 2 were characterized as being stable or unstable based on the visually observed absence or presence of precipitate in the emulsion after being allowed to stand under standard conditions (temperature: 23° C., humidity: 50%) for one day. The polymer emulsion was characterized as stable if no precipitate was observed. The polymer emulsion was characterized as unstable if precipitate was observed. As the data summarized in Table 2 shows, polymer emulsions prepared from monomer compositions (MC10-MC13) having an acrylate ester of a branched $C_{16}$-$C_{20}$ alcohol amount higher than 20% by weight were characterized as being unstable.

TABLE 2

Monomer Compositions (MC10-MC13) and the
Resulting Polymer Emulsion Stability

| Monomer wt % | MC10 | MC11 | MC12 | MC13 |
|---|---|---|---|---|
| Vinyl acetate (VAM) | 100 | 97 | 80 | 70 |
| Acrylic Ester Mixture | 0 | 3 | 20 | 30 |
| Resulting Polymer Emulsion Stable (Yes or No) | Yes | Yes | Yes | No (precipitate observed) |

The "Acrylic Ester Mixture" of Table 2 is a mixture of acrylate esters of branched $C_{16}$-$C_{20}$ alcohols comprising (i) about 23 to about 27 by weight percent of 2-propenoic acid 2-hexyldodecyl ester; (ii) about 27 to about 33 by weight percent of 2-propenoic acid 2-octyldodecyl ester; (iii) about 23 to about 27 by weight percent of 2-propenoic acid 2-octyldecyl ester; and (iv) about 15 to about 20 by weight percent of 2-propenoic acid 2-hexyldecyl ester. The "Acrylic Ester Mixture" of Table 2 was prepared by reacting Isofol® 18T with 2-propenoic acid under conditions suitable for esterification conditions known in the art. Isofol® 18T is a mixture of branched $C_{16}$-$C_{20}$ alcohols comprising (i) 23-27 weight percent of 2-hexyl-1-dodecanol; (ii) 27-33 weight percent of 2-octyl-1-dodecanol; (iii) 23-27 weight percent of 2-octyl-1-decanol; and (iv) 15-20 weight percent of 2-hexyl-1-decanol.

Monomer Compositions (MC11-M12) of Table 1 are each an embodiment of a monomer composition of the invention. Monomer compositions (MC10 and MC13) are not monomer compositions of the invention and are provided for comparative purposes.

Example 3. Preparation of Polymer Powders

Polymer powders were prepared using the polymer emulsions prepared from the monomer compositions (MC1-MC9) shown in Table 1. Generally, the polymer emulsion was admixed with 7 wt. % by weight (solids/solids) of polyvinyl alcohol having a degree of hydrolysis of 88 mol. % and viscosity of 5 cps. The polymer emulsion was then sprayed using a rotate disk. The polymer emulsion droplets were dried with hot air (165° C.). The dried polymer obtained was admixed with 14 wt. % by weight, based on the polymer, of commercially available antiblocking agent (calcium carbonate) to provide the polymer powder.

Example 4. Preparation of Tile Adhesive Formulations

Tile adhesive formulations were prepared using the polymer powders prepared from the polymers obtained from the monomer compositions (MC1-MC9) shown in Table 1. For the tile adhesive formulations, exemplary base drymixes were prepared with the components and amounts shown in Table 3. The base drymix was then added to water in a 4:1 wt/wt ratio (base drymix:water) to provide the tile adhesive formulations.

TABLE 3

Base Drymix for Tile Adhesive Formulations

| | Amount (wt. %) |
|---|---|
| Portland cement (CEM I 42.5) | 37.2 |
| Quartz sand (≤0.5 mm) | 59.5 |
| Water retention agent Tylose Hi90SH-3000 | 0.3 |
| Polymer powder (from MC1-MC9) | 3 |

Example 5. Adhesive Strength of Tile Adhesive Formulations

Adhesive strength of the tile adhesive formulations was tested in accordance with the EN1348 standard. General testing conditions were as follows. Preparation of test units: a thin layer of tile adhesive formulation was applied to a concrete slab substrate with a straight edge trowel. A second thicker layer of tile adhesive formulation was applied and the thicker layer was combed with a notched trowel having 6 mm×6 mm notches with a separation of 12 mm (notch center-to-center distance). The thicker layer was combed by holding the notched trowel at an angle of approximately 60 degrees relative to the surface of the concrete slab substrate and at a right angle to one edge of the concrete slab substrate and then drawing the notched trowel across the surface of the concrete slab substrate relative to that edge. The tile adhesive formulation was allowed to sit for 5 minutes under normal laboratory conditions. After 5 minutes at normal laboratory conditions, porcelain tiles with a flat bonding surface and dimensions of 50 mm×50 mm were placed on the tile adhesive formulation applied to the surface of the concrete slab substrate at a distance of 50 mm between each porcelain tile and with a load of 20 N for 30 seconds for each porcelain tile.

For the 28 day dry curing test (28 d), the concrete slab was kept for 27 days under normal laboratory conditions. Pile caps were adhered to the porcelain tiles using a commercially available two-part epoxy glue. The concrete slab was kept for another 24 hours under normal laboratory conditions and the adhesive strength of the tile adhesive formulation was measured with a force of 250 N/s±50.

For the 7 day dry, 21 day wet curing test (7 d21 w), the slab was kept for 7 days under normal laboratory conditions followed by submersion in water at room temperature for 20 days. The concrete slab was removed from the water and pile caps were adhered to the porcelain tiles using a commercially available two-part epoxy glue. The concrete slab was resubmerged in water for another 24 hours and the adhesive strength of the tile adhesive formulation was measured immediately after removing it from the water.

For the 14 day dry, 14 day hot curing test (14 d14 h1 d), the concrete slab with the porcelain tiles attached was kept for 14 days. The concrete slab with the porcelain tiles attached was transferred to a kiln and kept for another 14 days in the kiln with an air flow at 70° C.±2. The concrete slab with the porcelain tiles attached was removed from the kiln and pile caps were adhered to the porcelain tiles using the reaction resin adhesive i.e., the tile adhesive formulation. The concrete slab with the porcelain tiles and pile caps adhered thereto was kept for another 24 hours and adhesive strength was measured.

Adhesive strength results of the tile adhesive formulations prepared from the monomer compositions (MC1-MC9) are shown in Table 4.

TABLE 4

Adhesive Strength of Tile Adhesive Formulations Derived From Monomer Compositions (MC1-MC9)

|  |  | MC1 | MC2 | MC3 | MC4 | MC5 |
|---|---|---|---|---|---|---|
| Adhesive Strength (N/mm$^2$) | 28 d | 1.92 | 2.14 | 1.46 | 1.14 | 1.83 |
|  | 7 d 21 w | 0.55 | 0.8 | 0.86 | 0.97 | 0.86 |
|  | 14 d 14 h 1 d | 1.06 | 1.05 | 0.32 | 0.46 | 0.78 |
|  |  | MC6 | MC7 | MC8 | MC9 |  |
| Adhesive Strength (N/mm$^2$) | 28 d | 1.9 | 2.04 | 1.81 | 1.5 |  |
|  | 7 d 21 w | 0.84 | 0.81 | 0.11 | 0.7 |  |
|  | 14 d 14 h 1 d | 0.43 | 0.97 | 0 | 0.64 |  |

According to the experimental results as shown in Table 4, the tile formulations of the present invention (i.e. MC1-MC6) have higher adhesive strength after the wet condition.

Example 6. Preparation of Render Formulations

Render formulations were prepared using the polymer powders prepared from the polymers obtained from the monomer compositions (MC1-MC9) shown in Table 1. For the render formulations, exemplary base drymixes were prepared with the components and amounts shown in Table 5. The base drymix was then added to water in a 5:1 wt/wt ratio (base drymix:water) to provide the render formulations.

TABLE 5

Base Drymix for Render Formulations

|  | Amount (wt. %) |
|---|---|
| Portland cement (CEM I 42.5) | 28 |
| Calcium carbonate (20-70 pm) | 19 |
| Quartz sand (≤0.5 mm) | 49.85 |
| Water retention agent (Tylose Hi90SH-3000) | 0.15 |
| Polymer powder (from MC1-MC9) | 3 |

Water absorption of the render formulations was tested in accordance with a modified DIN52617 standard. Adhesive strength of the render formulations was tested in accordance with the procedure described herein.
General testing conditions were as follows.
14 Day Dry Curing Adhesion Strength
Adhesive strength: Module frames having a 3 mm thickness were mounted on a concrete slab substrate for making the 3 mm thickness render formulation test specimens. The render formulation test specimens were kept for dry curing for 14 days under normal laboratory conditions (temperature: 23° C.; humidity: 50%). One day before completion of the test, holes were drilled into the render formulation test specimens and pile caps were adhered to the render formulation test specimens using a commercially available two-part epoxy glue. Adhesive strength was measured. The adhesive strength results reported in Table 6 are the average of three measurements.
14 Day Water Absorption
Water absorption: Module frames with 3 mm thickness were mounted on a concrete slab substrate for making 3 mm thickness render formulation test specimens. The render formulation test specimens were kept for 14 days under normal laboratory conditions (temperature: 23° C.; humidity: 50%). On the 13$^{th}$ day, a glass container was adhered to the render formulation test specimen. After the completion of the test, the glass container was filled with water and the water absorption volume was measured after another 24 hours. Absorption rate (unit absorption per unit of area) was calculated as the total absorption after 24 hours/material applied area. Water absorption results are shown in Table 6.

TABLE 6

Adhesive Strength and Water Absorption of Render Formulations Derived from Monomer Compositions (MC1-MC9)

|  | MC1 | MC2 | MC3 | MC4 | MC5 |
|---|---|---|---|---|---|
| 14d adhesive strength (N/mm$^2$) | 2 | 1.78 | 1.81 | 1.75 | 2.06 |
| 14d water absorption (g/cm$^2$) | 1.848 | 2.469 | 2.646 | 3.763 | 1.912 |
|  | MC6 | MC7 | MC8 | MC9 |  |
| 14d adhesive strength (N/mm$^2$) | 1.65 | 1.8 | 0.82 | 1.55 |  |
| 14d water absorption (g/cm$^2$) | 2.081 | 1.594 | 2.95 | 2.779 |  |

As can be seen from the data presented in Table 4 and Table 6, in various embodiments, polymers of the invention have increased adhesive strength relative to one or more of the comparative examples. In various embodiments, polymers of the invention have dry and/or wet immersion adhesive strength that is further increased by incorporating lauryl acrylate in the polymers. In various embodiments, polymers of the invention have lower water absorbency relative to one or more of the comparative examples.

Example 7. Polymer Film Water Resistance

Conditions: The prepared polymer emulsion was flattened to form a film with a thickness of 0.36 mm After that, the film was allowed to stand for one day at room temperature and a dry film was formed. The resultant dry film was used for testing the character of water resistance. First, 2 milliliter of water was applied to and spread on the film surface. After that, the water resistance of the different polymer films are defined by three levels in accordance with the time required for the film to rupture as shown in Table 8. Polymer film water resistance results are shown in Table 9.

TABLE 8

Levels of Polymer Film Water Resistance

| Level | Time of film rupture (seconds) |
|---|---|
| LEVEL 1 | 1~6 |
| LEVEL 2 | 7~40 |
| LEVEL 3 | >40 |

TABLE 9

Results of Polymer Film Water Resistance Test

|  | Level | Time of film rupture (seconds) |
|---|---|---|
| vinyl acetate ethylene with the polymer of present invention | LEVEL 2 | 12 |

TABLE 9-continued

Results of Polymer Film Water Resistance Test

| | Level | Time of film rupture (seconds) |
|---|---|---|
| vinyl acetate ethylene without the polymer of present invention | LEVEL 1 | 3 |

The various methods and techniques described above provide a number of ways to carry out the application. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

Various embodiments of this application are described herein, including the best mode known to the inventors for carrying out the application. Variations on those embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

All patents and other publications identified in the specification and examples are expressly incorporated herein by reference for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail. These patents and other publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

It is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

Various embodiments of the invention are described above in the Detailed Description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventors that the words and phrases in the specification and claims be given the ordinary and accustomed meanings to those of ordinary skill in the applicable art(s).

The foregoing description of various embodiments of the invention known to the applicant at this time of filing the application has been presented and is intended for the purposes of illustration and description. The present description is not intended to be exhaustive nor limit the invention to the precise form disclosed and many modifications and variations are possible in the light of the above teachings. The embodiments described serve to explain the principles of the invention and its practical application and to enable others skilled in the art to utilize the invention in various embodiments and with various modifications as are suited to the particular use contemplated. Therefore, it is intended that the invention not be limited to the particular embodiments disclosed for carrying out the invention.

Although particular embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow. Further, to the extent not already indicated, it will be understood by those of ordinary skill in the art that any one of the various embodiments herein described and illustrated can be further modified to incorporate features shown in any of the other embodiments disclosed herein.

What is claimed is:

1. A mortar formulation comprising a hydraulically setting cement and a copolymer, wherein the copolymer comprises 60 to 97 percent by weight of vinyl acetate; and at least one acrylic ester of a branched alcohol, wherein the branched alcohol is a branched $C_{20}$-$C_{32}$ alcohol, and the acrylic ester of the branched alcohol has the structure of Formula (III):

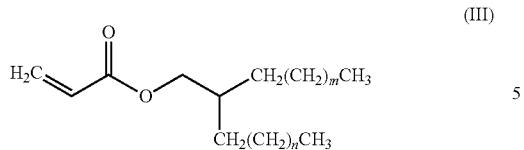

wherein m is 8 to 22; and n is 6 to 13, wherein 14≤m+n≤26.

2. The formulation of claim 1, wherein the mortar formulation is one selected from the group consisting of a tile adhesive formulation and a render formulation.

3. The formulation of claim 1, wherein the mortar formulation is a render formulation.

4. The formulation of claim 3, wherein the render formulation has a 14 day dry curing adhesion strength of greater than 1.8 N/mm$^2$ to about 2.0 N/mm$^2$.

5. The formulation of claim 3, wherein the render formulation has a 14 day water absorption in the range of about 1.8 g/cm$^2$ to less than 2.7 g/cm$^2$.

6. The formulation of claim 3, wherein the render formulation has a 14 day dry curing adhesion strength in the range of 1.65 N/mm$^2$ to 2.06 N/mm$^2$ and a 14 day water absorption in the range of 1.85 g/cm$^2$ to 3.76 g/cm$^2$.

7. The mortar formulation of claim 1 further comprising a filler.

8. The mortar formulation of claim 7, wherein the filler comprises quartz sand in an amount of about 35 to about 65% by weight of the total composition.

9. The mortar formulation of claim 8, wherein the quartz sand has a particle size less than or equal to 0.5 mm.

* * * * *